United States Patent [19]
Yamazaki

[11] Patent Number: 5,521,855
[45] Date of Patent: May 28, 1996

[54] MULTIPLYING CIRCUIT

[75] Inventor: Takao Yamazaki, Kanagawa, Japan

[73] Assignee: Sony Corporation, Tokyo, Japan

[21] Appl. No.: 292,589

[22] Filed: Aug. 18, 1994

Related U.S. Application Data

[63] Continuation of Ser. No. 985,089, Dec. 2, 1992, abandoned.

[30] Foreign Application Priority Data

Nov. 29, 1991 [JP] Japan .................................. 3-342168

[51] Int. Cl.$^6$ ................................ G06F 7/52; G06F 7/38
[52] U.S. Cl. ........................................... 364/760; 364/745
[58] Field of Search .............................. 364/724.16, 736, 364/748, 754, 757, 758, 759, 760, 786, 745

[56] References Cited

U.S. PATENT DOCUMENTS

| | | | |
|---|---|---|---|
| 4,748,584 | 5/1988 | Noda | 364/760 |
| 4,809,211 | 2/1989 | Kronlage et al. | 364/754 |
| 4,972,362 | 11/1990 | Elkind et al. | 364/760 |
| 5,193,070 | 3/1993 | Abiko et al. | 364/724.16 |
| 5,220,525 | 6/1993 | Anderson et al. | 364/760 |

FOREIGN PATENT DOCUMENTS

| | | | |
|---|---|---|---|
| 0428942 | 11/1990 | European Pat. Off. | G06F 7/52 |
| 3002970 | 9/1991 | Japan | G06F 15/31 |

OTHER PUBLICATIONS

Ware et al., "64 Bit Monolithic Floating Point Processors," IEEE Journal of Solid-State Circuits, vol. SC-17, No. 5, pp. 898-907, Oct. 1992.

Primary Examiner—Roy N. Envall, Jr.
Assistant Examiner—Chuong D. Ngo
Attorney, Agent, or Firm—Jay H. Maioli

[57] ABSTRACT

A multiplying circuit for forming a partial product in accordance with a Booth's algorithm, performing a sign correcting process of the partial product, and adding the partial product so as to multiply a multiplicand by a multiplier, includes: initial value setting circuit for setting an initial value and for supplying data necessary for the sign correcting process and adding circuit for adding the partial product and data supplied from a preceding circuit. The initial value setting circuit is adapted to output the data necessary for the sign correcting process in a format where the data accords with at least a part of a data input format of the adding circuit. In the adding circuit at least a part of a data input format of data thereof is the same as at least a part of a data output format thereof. According to the multiplying circuit, in the initial value setting circuit, data necessary for a sign correcting process, that is, calculating the complement of 2, of a partial product is converted into a format compatible with a data input format of an adding circuit. The resultant data is supplied to the adding circuit.

7 Claims, 13 Drawing Sheets

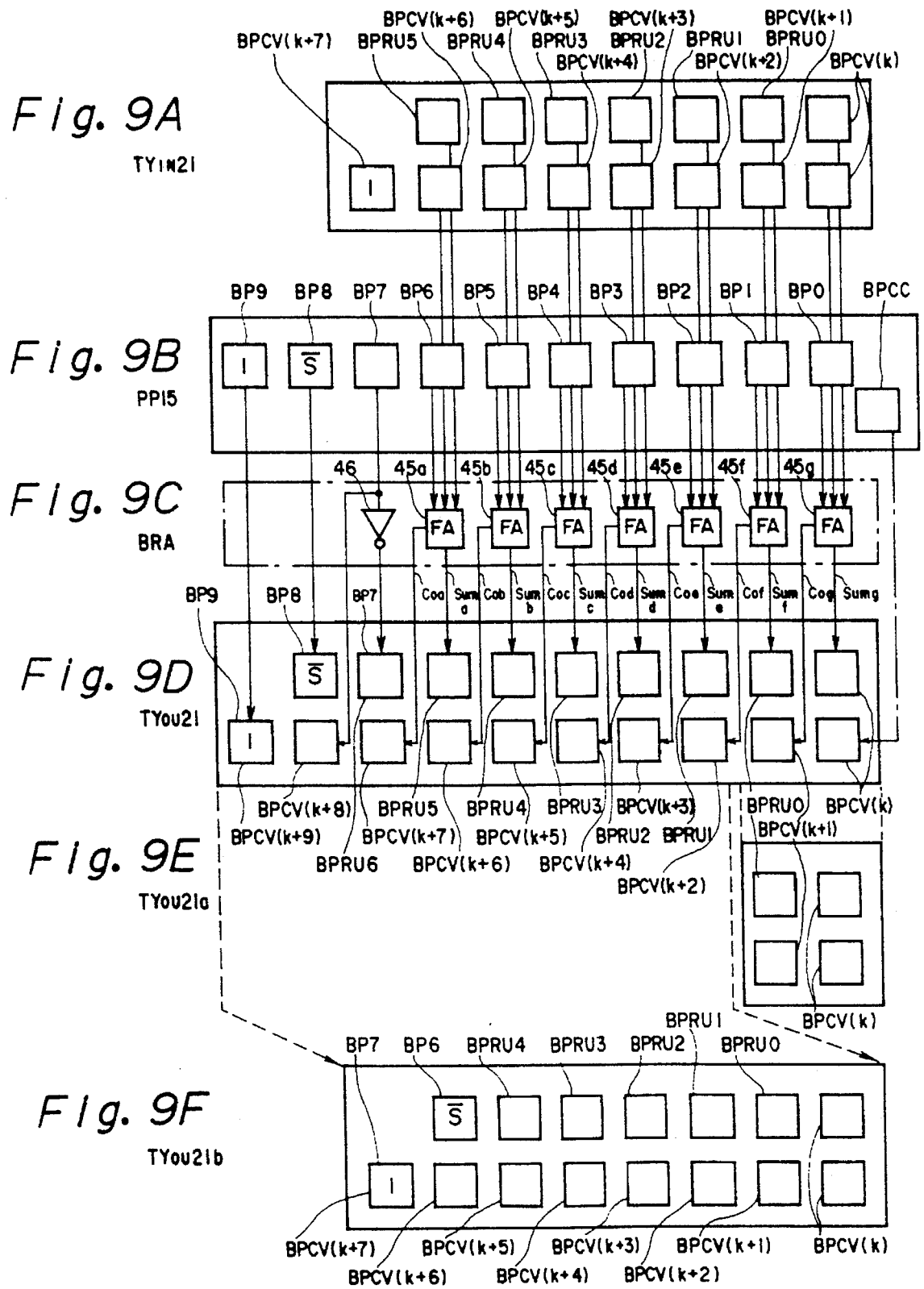

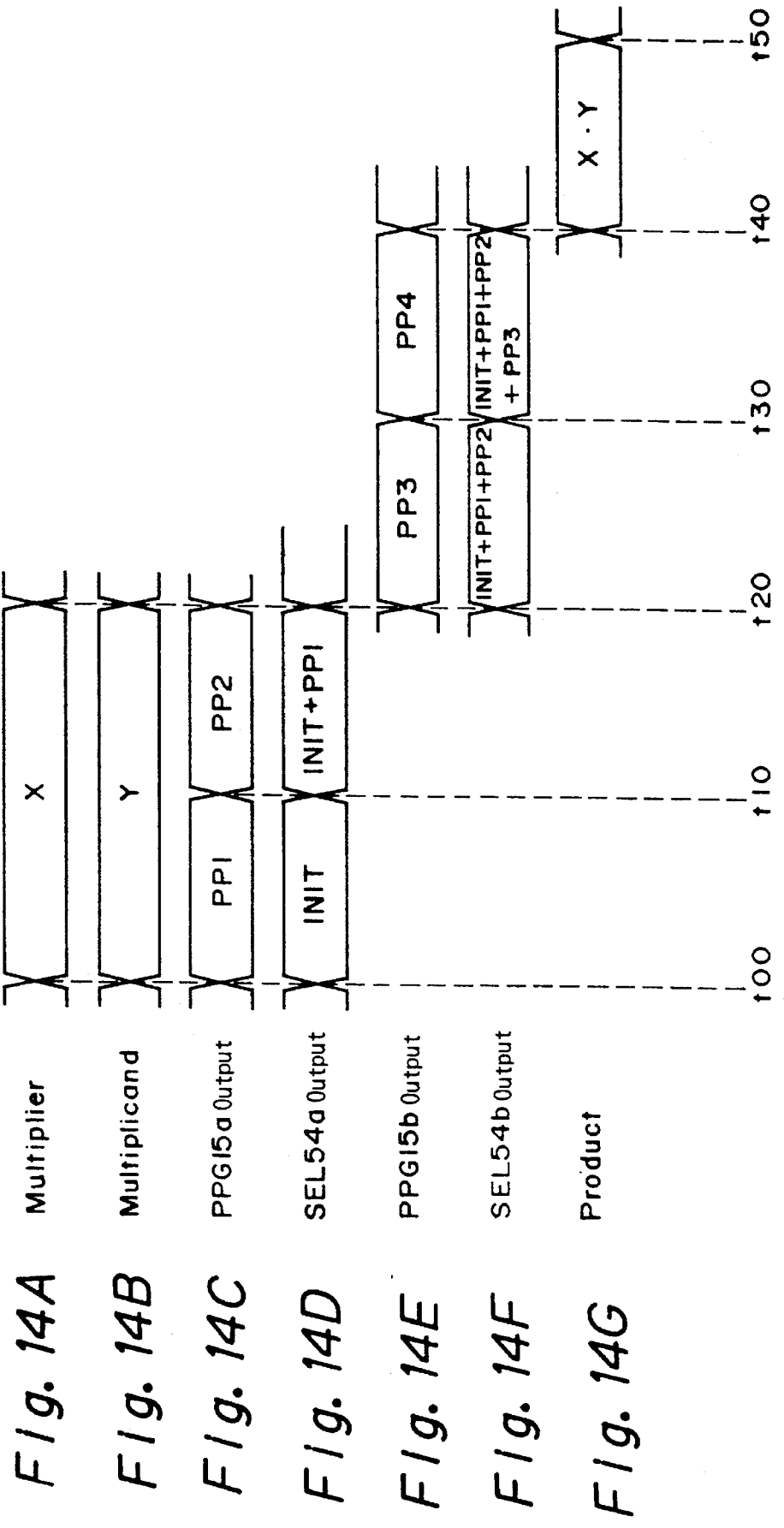

MULTIPLYING CIRCUIT

This is a continuation of application Ser. No. 07/985,089 filed Dec. 2, 1992 now abandoned.

BACKGROUND OF THE INVENTION

1. Field of the Invention

The present invention relates to a multiplying circuit, and in particular, to a multiplying circuit suitable for an integrated circuit.

2. Description of the Prior Art

A multiplying circuit which forms partial products, adds them, and obtains the multiplication result is known. This multiplying circuit is mostly occupied by a circuit portion which adds partial products. To reduce the circuit scale of the multiplying circuit, by using the booth's algorithm, the number of partial products is decreased.

FIGS. 1 and 2 show the conception of multiplication using additions of partial products. In this multiplication, a rounding process shown in FIG. 1 and a complement calculating process shown in FIG. 2 are performed.

First, with reference to FIG. 1, the additions of partial products will be described. In FIG. 1, the conception of multiplication in accordance with the secondary Booth's algorithm is shown.

In FIG. 1, in each of partial products PP1 to PP4, bits BP0 to BP7 represent a multiplicand of eight bits. In addition, a bit BP8 represents a start bit Si (where i=1 to 4, $Si=-2^{n-1}$) having a negative weight. The bit BP7 represents the digit of ($2^{n-1}$). The bit BPCC represents the position of bit "1" which is added when data is converted into the notation using the complement of 2. In other words, according to the secondary Booth's algorithm, a partial product can be a value which is multiplied by 0, (±1), or (±2). In this specification, as the notation representing the collection of these values, the partial products PP1 to PP4 shown in FIG. 1 are used.

In FIG. 1, in the partial product PP2, the position of the bit BP0 which is the LSB is moved by two bits in the MSB direction on the basis of the position of the bit BP0 of the partial product PP1. Likewise, in the partial products PP3 and PP4, the position of the bit BP0 which is the LSB is moved by two bits in the MSB direction.

By adding the above-mentioned partial products PP1 to PP4, a product PROD shown in FIG. 1 is formed. The product PROD is not output entirely, but only partially due to a restriction of hardware. In the example, as shown in FIG. 1, digits on the L side of an alternate long and short dash line LCH are addition data which are output in accordance with an output word length. The remaining digits which are on the R side of the alternate long and short dash line LCH are addition data which are not output.

Next, with reference to FIG. 1, a rounding process will be described. The rounding process is used to output a part of calculation result due to various reasons. In this example as shown in FIG. 1, a rounding bit BPRU is added to low order digits of the alternate long and short dash line LCH which defines the output word length so as to obtain a product PROD. In addition, the remaining data on the right (arrow R side) of the alternate long and short dash line LCH is discarded. Such a process which determines data according to the output word length is the rounding process.

Next, with reference to FIG. 2, a calculating process of the complement of 2 will be described. The complement calculating process is performed to eliminate the necessity of processing the MSBs ($=-2^{n-1}$) of the partial products PP1 to PP4 represented with a solid line LO shown in FIG. 2.

In FIG. 2, the start bit Si can be serially disposed as follows.

$-[(0) (S4) (0) (S3) (0) (S2) (0) (S1)]$

When the polarities of all the bits are inverted, the resultant bits are represented as follows. Hereunder, "*" represents the state where the polarity was inverted.

$[(1) (S4*) (1) (S3*) (1) (S2*) (1) (S1*)]$

By adding a complement processing bit BPC (="1") to the LSB, the calculating process of the complement of 2 is performed. Thus, without necessity of processing MSBs ($=-2^{n-1}$) of the partial products PP1 to PP4, the product PROD as the multiplication result can be obtained by simply adding the partial products PP1 to PP4.

FIG. 3 shows an example of a multiplying circuit which performs a multiplication in accordance with the above-mentioned secondary Booth's algorithm. The multiplying circuit shown in FIG. 3 will now be described.

In the construction of FIG. 3, a multiplier of m bits (where m=8 in this example) is stored in a register 205. In addition, a multiplicand of n bits is stored in a register 206.

In the register 205, the multiplier is divided into blocks of two bits. One high order bit of a low order block is added to one low order bit of a high order block. Thus, data of successive three bits is formed. This data of three bits is supplied to each of Booth's encoder modules (hereinafter referred to as the BEMs) 208 to 211. In a register 212, data (="0") is stored. This data is supplied to the BEM 208.

Data of two bits, b1 and b2, on the LSB side of the multiplier is supplied to the BEM 208. In addition, as a bit b0, the data (="0") from the register 212 is supplied to the BEM 208. Further, the high order bit b2 of bits b1 and b2 is supplied to the BEM 209 as the LSB thereof.

Likewise, data of two bits, b3 and b4, is supplied to the BEM 209. The bit b2 is supplied to the BEM 209 as the LSB thereof. The high order bit b4 of bits b3 and b4 is supplied to the BEM 210 as the LSB thereof.

Data of two bits, b5 and b6, is supplied to the BEM 210. The bit b4 is supplied to the BEM 210 as the LSB thereof. The high order bit b6 of the two bits b5 and b6 is supplied to the BEM 211 as the LSB thereof.

Data of two bits, b7 and b8, is supplied to the BEM 211. The bit b6 is supplied to the BEM 211 as the LSB thereof.

In the BEMs 208 to 211, signals which define the magnification and pluse/minus sign of a partial product are formed in accordance with the data of three bits which is supplied in the above-mentioned manner. These signals are supplied from the BEMs 208 to 211 to partial product generating circuits (hereinafter referred to as the PPGs) 215 to 218, respectively.

On the other hand, the multiplicand of n bits which is received from the register 206 is supplied to the PPGs 215 to 218.

In the PPGs 215 to 218, respective partial products PP215 to PP218 where the complement calculating process (sign correcting process) has been performed are formed in accordance with the signals which define the multiplication and plus/minus sign of the partial products.

In each of the partial products PP215 to PP218, two bits of [(1) (Si*)], where the complement calculating process has been performed for the start bit Si, and the bit BPCC are added to the multiplicand of n bits. Thus, each of the partial products PP215 to PP218 is represented with (n+3) bits.

These partial products PP215 to PP218 are supplied to carry ripple adders (hereinafter referred to as CRAs) 221 to 224, respectively.

An initial value, the above-mentioned BPC bit, and so forth are supplied from an initial value setting circuit 220 to the CRA 221. A part of the initial value is obtained through an output terminal.

In the CRA 221, an addition is performed in accordance with the partial product PP215 which is supplied from the PPG 215 and the initial value, the complement processing bit BPC, and so forth which are supplied from the initial value setting circuit 220. An addition output of the CRA 221 is obtained from an output terminal thereof. In addition, a carry output of the CRA 221 is supplied to the CRA 222, which follows the CRA 221.

In the CRA 222, the partial product PP216 which is supplied from the PPG 216 and the carry output which is supplied from the CRA 221 are added. An addition output of the CRA 222 is obtained from an output terminal thereof. In addition, a carry output of the CRA 222 is supplied to the CRA 223, which follows the CRA 222.

In the CRA 223, the partial product PP217 which is supplied from the PPG 217 and the carry output which is received from the CRA 222 are added. An addition output of the CRA 223 is obtained from an output terminal thereof. In addition, a carry output of the CRA 223 is supplied to the CRA 224, which follows the CRA 223.

In the CRA 224, the partial product PP218 which is supplied from the PPG 218 and the carry output which is received from the CRA 223 are added. An addition output of the CRA 224 is obtained from an output terminal thereof. In addition, a carry output of the CRA 224 is supplied to an output terminal thereof. Thus, the product PROD is obtained.

In the conventional multiplying circuit according to the Booth's algorithm, arrays which perform a rounding process, complement calculating process, and so forth necessary for adding the partial products PP1 to PP4 were irregularly and two-dimensionally disposed as shown in FIG. 2.

In the conventional multiplying circuit according to the Booth's algorithm, the above-mentioned irregularly and two-dimensionally disposed circuit construction was used as it was. In other words, in the layout stage, efforts for constructing the circuit as regularly as possible were made through experience and perception of the designer. However, since the circuit construction was irregular, in the LSI producing stage, the circuit could not be effectively designed by using basic circuits in the same construction.

For example, as shown in FIG. 4, an example where a circuit is hierarchically constructed of multiplying cells as basic circuits, each of which consists of an AND gate 201 and a full adder 202, is known. However, this basic circuit construction was still in a small scale.

In addition, as another example, redundant circuits such as carry adders as shown in FIG. 3 were used as basic circuits. A multiplication was performed by using these basic circuits which were disposed in parallel. However, the carry adders which were used as basic circuits were redundant. Thus, this construction was not suitable from an optimum design point of view.

Although a combination type multiplying circuit can be designed in the above-mentioned manner, so far a time-division type multiplying circuit which performs a multiplication repeatedly using small circuits has not been effectively accomplished.

OBJECTS AND SUMMARY OF THE INVENTION

An object of the present invention is, therefore, to provide a multiplying circuit which can be effectively designed.

According to an aspect of the present invention, there is provided a multiplying circuit for forming a partial product in accordance with a Booth's algorithm, performing a sign correcting process of the partial product, and adding the partial product so as to multiply a multiplicand by a multiplier, comprising:

initial value setting means for setting an initial value and for supplying data necessary for the sign correcting process; and adding means for adding the partial product and data supplied from a preceding circuit;

wherein the initial value setting means is adapted to output the data necessary for the sign correcting process in a format equivalent to the data where the data accords with at least a part of a data input format of the adding means; and wherein in the adding means at least a part of a data input format of data thereof is the same as at least a part of a data output format thereof.

According to another aspect of the present invention, there is provided a multiplying circuit for performing a multiplication of data of m bits and data of n bits in accordance with a Booth's algorithm, comprising:

means for dividing an input data of m bits into blocks of predetermined bits and for performing preprocessing by a plurality of Booth's encoder modules so that at least one bit of the blocks of predetermined bits overlaps;

a plurality of partial product generating means for generating a partial product of each output of the plurality of Booth's encoder modules and data of one bit of the data of n bits;

a plurality of Booth's redundancy adders for performing an addition based on each output of the plurality of partial product generating means and an output of an initial value setting circuit, the plurality of Booth's redundancy address having the same construction; and at least one carry ripple adder for performing a carry addition based on each output of the plurality of Booth's redundancy adders and the output of the initial value setting circuit.

According to still another aspect of the present invention, there is provided a multiplying circuit for performing a multiplication of data of m bits and data of n bits in accordance with a Booth's algorithm, comprising:

means for dividing an input data of m bits into blocks of predetermined bits and for performing preprocessing by a single Booth's encoder module so that at least one bit of the blocks of predetermined bits overlaps;

a single partial product generating means for generating a partial product of an output of the Booth's encoder module and data of one bit of the data of n bits;

a single Booth's redundancy adders for performing an addition based on an output of the plurality of partial product generating means and an output of an initial value setting circuit;

at least one carry ripple adder for performing a carry addition based on an output of the Booth's redundancy adders and the output of the initial value setting circuit.

selecting means for selectively outputting the input data of m bits in blocks of predetermined bits every predetermined period of time; and means for temporarily storing the output of the Booth's redundancy adder and thereafter feeding back the output to the Booth's redundancy adder every predetermined period of time.

The above, and other, objects, features and advantage of the present invention will become readily apparent from the following detailed description thereof which is to be read in connection with the accompanying drawings.

BRIEF DESCRIPTION OF THE DRAWINGS

FIGS. 9A to 9F are schematic diagrams which describe the construction and operation of a redundant binary adder of the multiplying circuit;

FIG. 14A through 14G are timing charts which describes the operation of the third embodiment.

DETAILED DESCRIPTION OF THE PREFERRED EMBODIMENTS

Embodiments of the present invention will now be described with reference to FIGS. 5 to 14A through 14G.

FIGS. 5 to 9D show the first embodiment of the present invention. In the first embodiment, the present invention is applied to a combination type multiplying circuit which performs a multiplication in accordance with the secondary Booth's algorithm.

Figure 5:
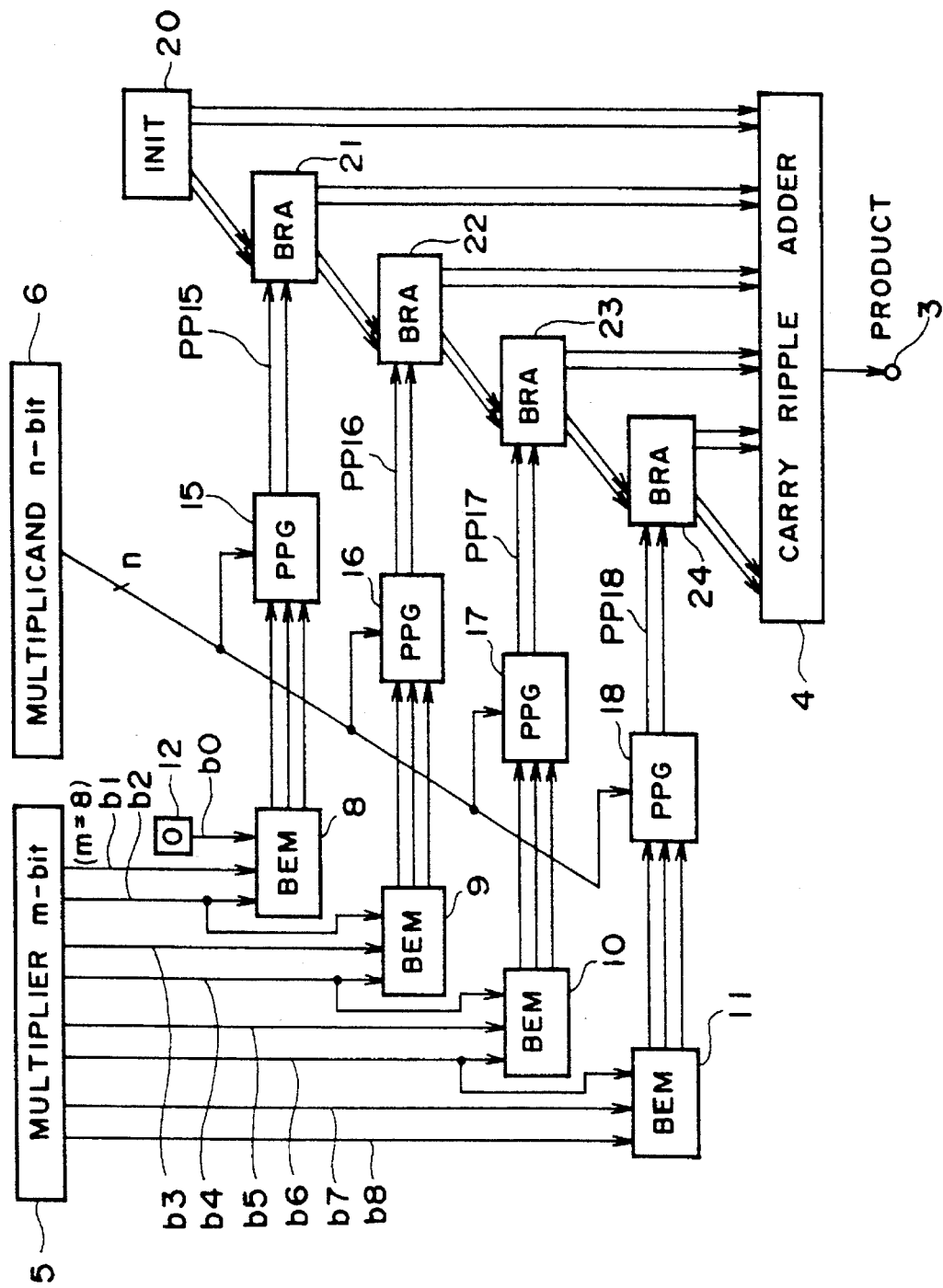
FIG. 5 is a block diagram which shows a first embodiment of a multiplying circuit according to the present invention.

In the construction of FIG. 5, a multiplier of m bits (where m=8 in this example) is stored in a register 5. In addition, a multiplicand of n bits is stored in a register 6.

In the register 5, the multiplier is divided into blocks of two bits. One high order bit of a low order block is added to one low order bit of a high order block. Thus, data of successive three bits is formed. This data of three bits is supplied to each of Booth's encoder modules (hereinafter referred to as the BEMs) 8 to 11. In a register 12, data (="0") is stored. This data is supplied to the BEM 8.

Data of two bits, b1 and b2, on the LSB side of the multiplier is supplied to the BEM 8. In addition, as a bit b0, the data (="0") from the register 12 is supplied to the BEM 8. Further, the high order bit b2 of bits b1 and b2 is supplied to the BEM 9 as the LSB thereof.

Likewise, data of two bits, b3 and b4, is supplied to the BEM 9. The bit b2 is supplied to the BEM 9 as the LSB thereof. The high order bit b4 of bits b3 and b4 is supplied to the BEM 10 as the LSB thereof.

Data of two bits, b5 and b6, is supplied to the BEM 10. The bit b4 is supplied to the BEM 10 as the LSB thereof. The high order bit b6 of the two bits b5 and b6 is supplied to the BEM 11 as the LSB thereof.

Data of two bits, b7 and b8, is supplied to the BEM 11. The bit b6 is supplied to the BEM 11 as the LSB thereof.

In the BEMs 8 to 11, signals which define the magnification and plus/minus sign of a partial product are formed in accordance with the data of three bits supplied in the above-mentioned manner. These signals are supplied from the BEMs 8 to 11 to partial product generating circuits (hereinafter referred to as the PPGs) 15 to 18, respectively.

On the other hand, the multiplicand of n bits is supplied from the register 6 to the PPGs 15 to 18.

In the PPGs 15 to 18, respective partial products PP15 to PP18 where the complement calculating process (sign correcting process) has been performed are formed in accordance with the signals which define the multiplication and sign of the partial products.

In each of the partial products PP15 to PP18, two bits of [(1) (Si*)], where the complement calculating process has been performed for the start bit Si, and the bit BPCC are added to the multiplicand of n bits. Thus, each of the partial products PP15 to PP18 is represented with (n+3) bits. These partial products PP15 to PP18 are supplied to Booth's redundancy adder (hereinafter referred to as the BRAs) 21 to 24, respectively.

Four bits on the LSB side of data including an initial value which are output from the initial value setting circuit 20 are supplied to a carry ripple adder (hereinafter referred to as the CRA) 4. On the other hand, the data including the initial value except for the abovementioned four bits on the LSB side are supplied to the BRA 21.

The details of the PPGs 15 to 18, the BRAs 21 to 24, and the initial value setting circuit 20 will be described later. Each data is supplied from the initial value setting circuit 20 to the BRA 21 through two respective lines. Each data is supplied between the BRAs 21 to 24 through two respective lines. In addition, each data is supplied from the initial value setting circuit 20 and the BRAs 21 to 24 to the CRA 4 through two respective lines. In other words, each data is represented in redundant binary notation where two lines are used per bit.

In the BRA 21, the partial product PP15 which is supplied from the PPG 15 and the data containing the initial value which is received from the initial value setting circuit 20 are added. Four bits on the LSB side of the addition output of the BRA 21 are supplied to the CRA 4. The addition output except for the four bits on the LSB side are supplied to the BRA 22, which follows the BRA;

In the BRA 22, the partial product PP16 which is supplied from the PPG 16 and the addition output which is supplied from the BRA 21 are added. Four bits on the LSB side of the addition output of the BRA 22 are supplied to the CRA 4. The addition output except for the four bits on the LSB side are supplied to the BRA 23, which follows the BRA 22.

In the BRA 23, the partial product PP17 which is supplied from the PPG 17 and the addition output which is supplied from the BRA 22 are added. Four bits on the LSB side of the addition output of the BRA 23 are supplied to the CRA 4. The addition output except for the four bits on the LSB side are supplied to the BRA 24, which follows the BRA 23.

In the BRA 24, the partial product PP18 which is supplied from the PPG 18 and the addition output which is supplied from the BRA 23 are added. The addition output of the BRA 24 is supplied to the CRA 4.

In the CRA 4, a carry addition of the data which is supplied from the initial value setting circuit 20 and the BRAs 21 to 24 is performed. Thus, an addition output of the CRA 4 is formed. The addition output is obtained through a terminal 3.

Figure 1:
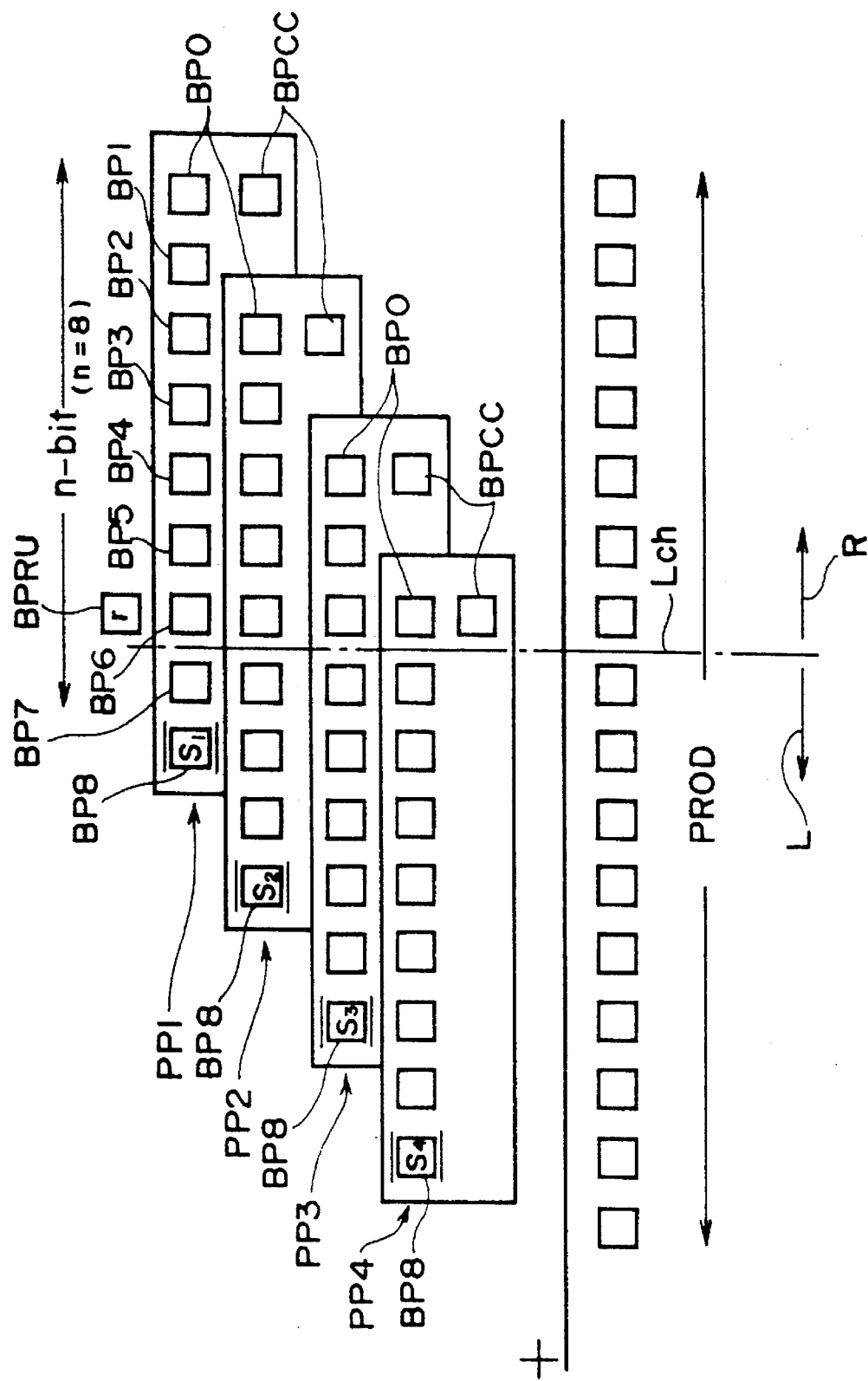
FIG. 1 is a schematic diagram which describes an addition of partial products in accordance with the secondary Booth's algorithm.
Figure 2:
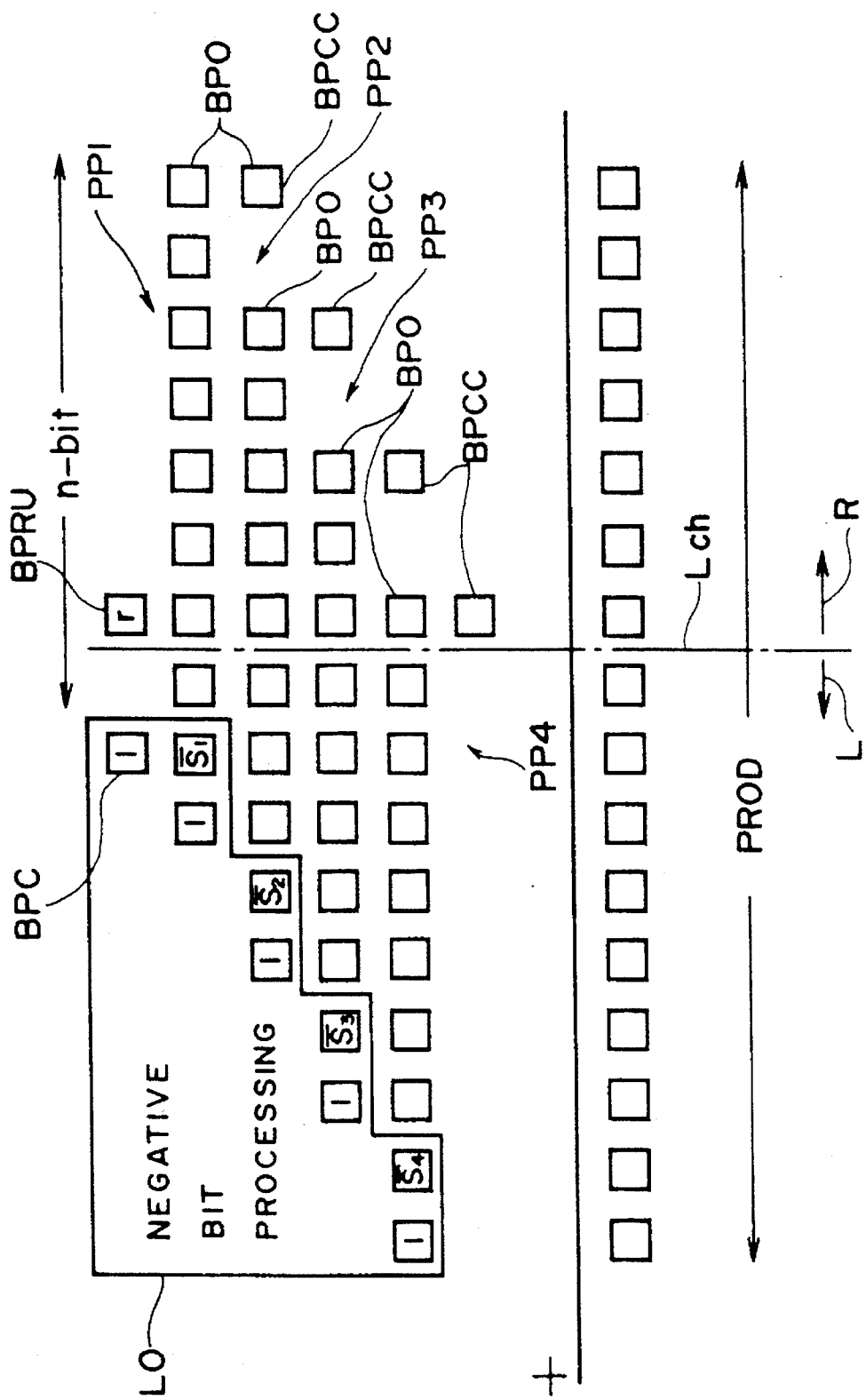
FIG. 2 is a schematic diagram which describes a code correction which is performed for an addition of partial products in accordance with the secondary Booth's algorithm.
Figure 3:
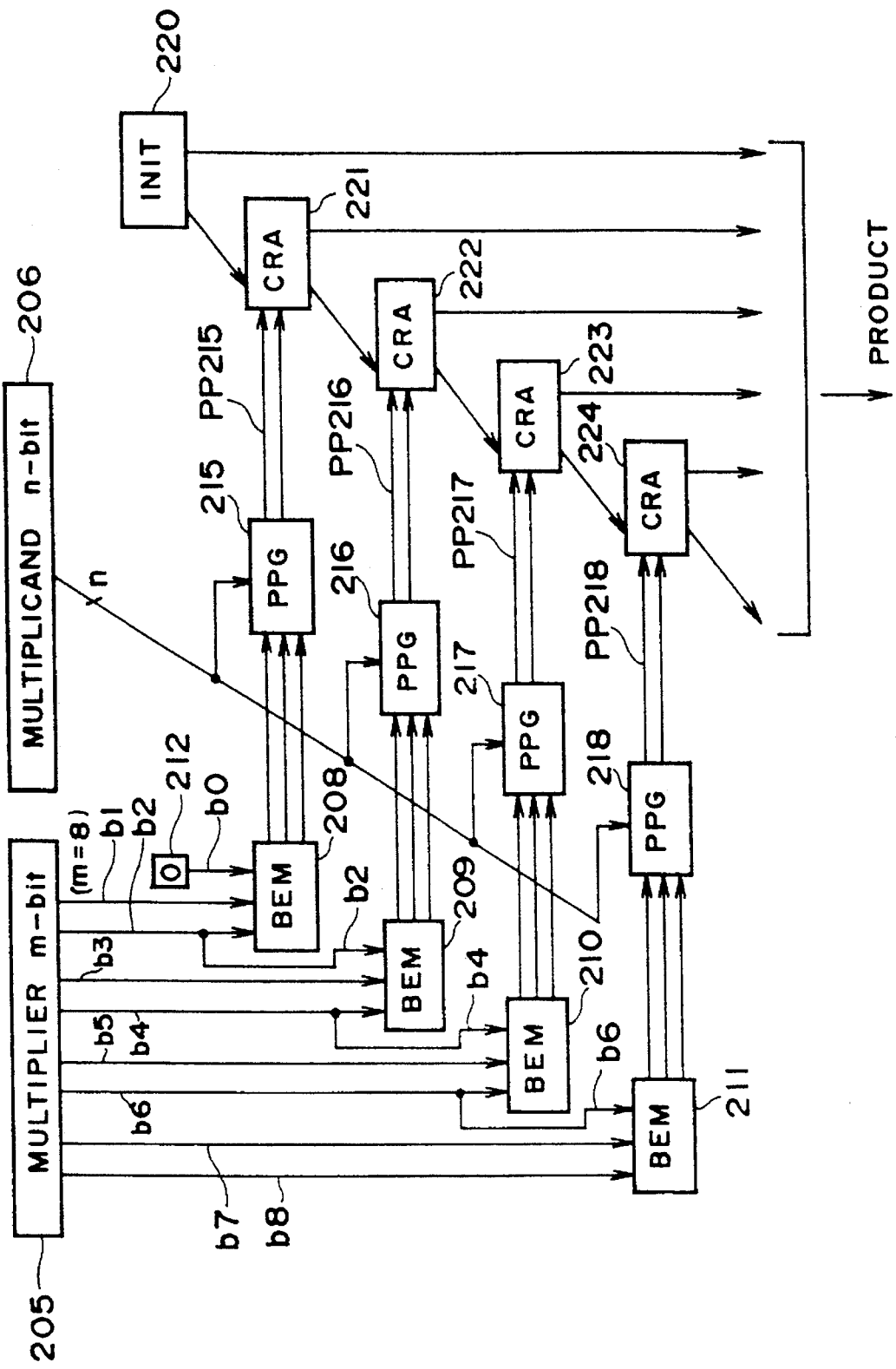
FIG. 3 is a block diagram which shows the construction of a conventional multiplying circuit.
Figure 4:
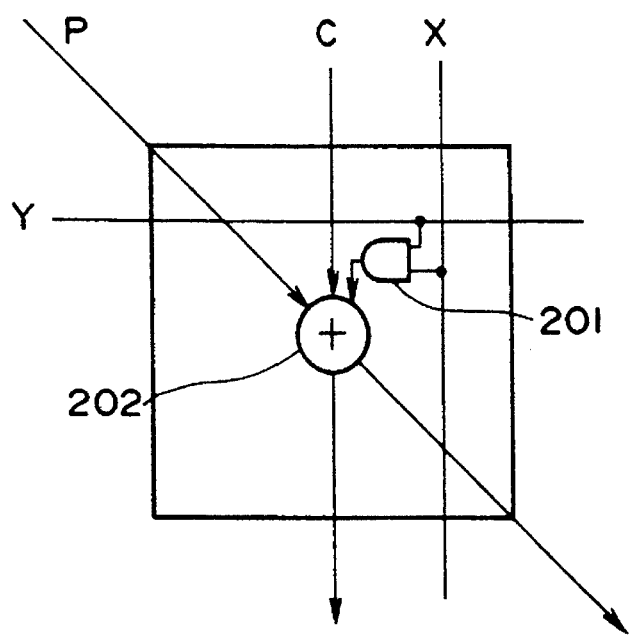
FIG. 4 is a block diagram which shows the construction of a multiplying cell.
Figure 7:
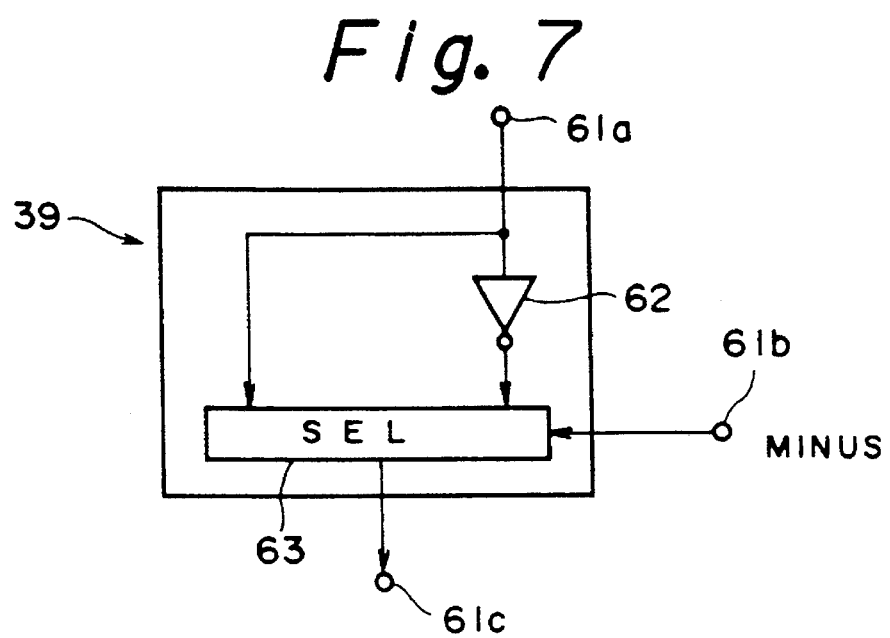
FIG. 7 is a block diagram which shows the construction of an inverter for use in the partial product generating circuit.
Figure 6:
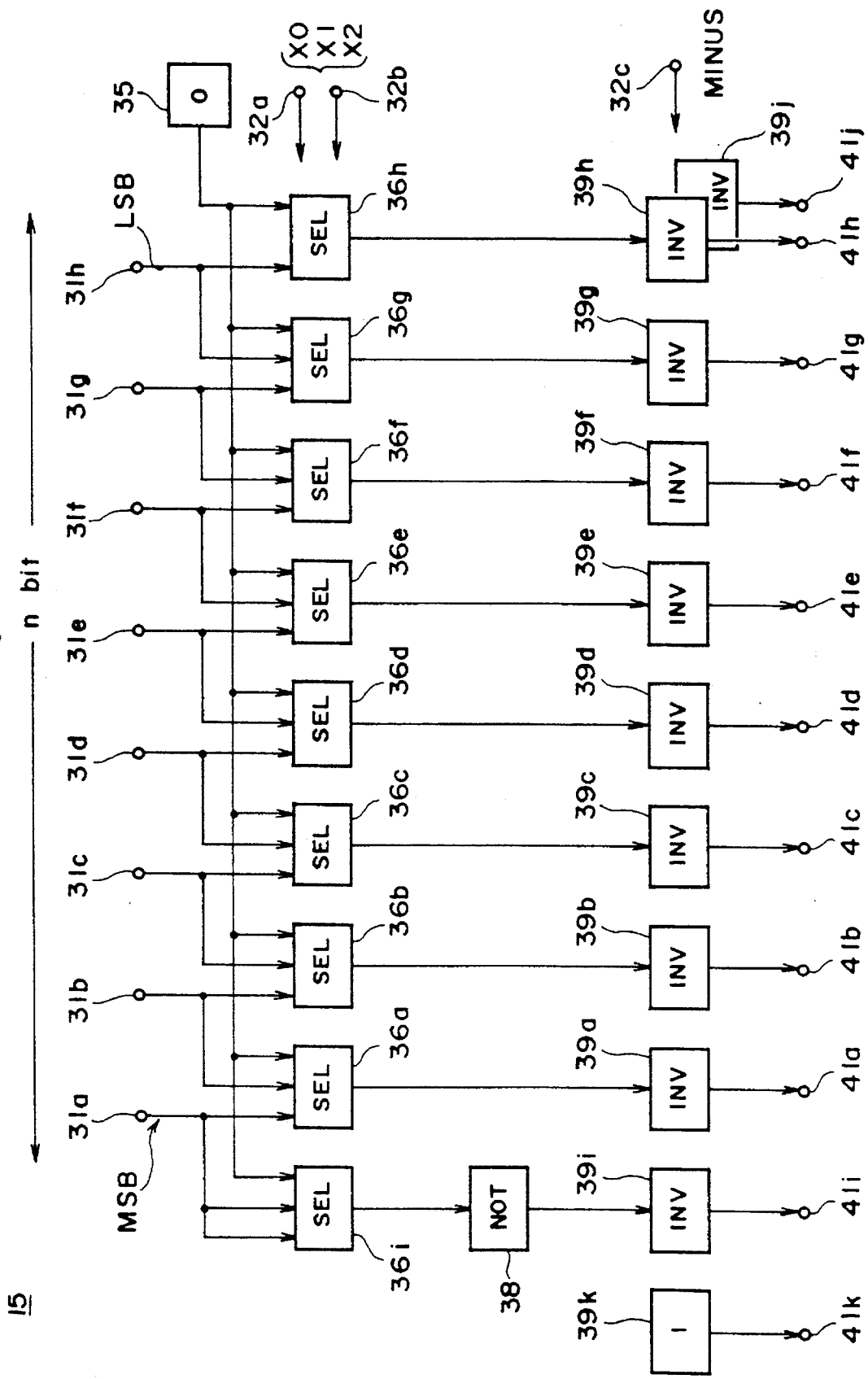
FIG. 6 is a block diagram which shows the construction of a partial product generating circuit of the multiplying circuit.

FIGS. 6 and 7 show the construction of the PPGs 15 to 18.

The multiplicand of n bits which is stored in the register 6 is supplied to selectors 36a to 36i through terminals 31a to 31h, respectively. In addition, in a register 35, data (="0") is stored. This data is supplied to the selectors 36a to 36i.

The MSB of the multiplicand which is supplied through the terminal 31a is supplied to the selector 36i as data of two bits. In addition, the data (="0") which is stored in the register 35 is supplied to the selector 36i as data of one bit. On the other hand, the data of two bits of the multiplicand which are supplied through the terminals 31a and 31b are supplied to the selector 36a. In addition, the data (="0") of one bit which is stored in the register 35 is supplied to the selector 36a.

Data of two bits which is received from the terminals 31b and 31c and data of one bit which is received from the register 35 are supplied to the selector 36b. Data of two bits which is received from the terminals 31c and 31d and data of one bit which is received from the register 35 are supplied to the selector 36c.

Data of two bits which is received from the terminals 31d and 31e and data of one bit which is received from the register 35 are supplied to the selector 36d. Data of two bits which is received from the terminals 31e and 31f and data of one bit which is received from the register 35 are supplied to the selector 36e.

Data of two bits which is received from the terminals 31f and 31g and data of one bit which is received from the register 35 are supplied to the selector 36f. Data of two bits which is received from the terminals 31g and 31h and data of one bit which is received from the register 35 are supplied to the selector 36g. Data of one bit which is received from the terminal 31h and data of one bit which is received from the register 35 are supplied to the selector 36h.

In each of the selectors 36a to 36i except for the selector 36h, one of three inputs is selected and then output. This selection in the selectors 36a to 36i is performed in accordance with a signal which represents the magnification of a partial product, the signal being supplied through terminals 32a and 32b. In the selector 36h, one of two inputs is selected and then output.

When the signal which represents the magnification is (=0), in the selectors 36a to 36i, the data (="0") which is received from the register 35 is selected and then output.

When the signal which represents the magnification is (=1), in the selectors 36a to 36h, the respective inputs of the terminals 36a to 36h are selected and then output. For example, in the selector 36a, the input of the terminal 31a is selected. In the selector 36b, the input of the terminal 31b is selected. Likewise, in the selectors 36c to 36h, the respective inputs of the terminals 31c to 31h are selected.

When the signal which represents the magnification is (=2), in each of the selectors 36a to 36g and 36i, data which is supplied from a one-bit lower terminal of the terminals 31a to 31h is shifted and selected. For example, in the selector 36i, the input of the terminal 31a is selected. In the selector 36a, the input of the terminal 31b is selected. Likewise, in the selectors 36b to 36g, the respective inputs of the terminals 31c to 31h are selected.

The output of the selector 36i is supplied to an inverter circuit 39i through a NOT circuit 38. The outputs of the selectors 36a to 36g are supplied to inverter circuits 39a to 39g, respectively. The output of the selector 36h is supplied to inverter circuits 39h and 39i.

In a register 39k, data (="1") is stored. This data is obtained from a terminal 41k.

FIG. 7 shows the construction of the inverter circuits 39a to 39j.

In the construction shown in FIG. 7, an input is supplied to both an inverter 62 and a selector 63. In the inverter 62, the input signal is inverted. The resultant inverted signal is supplied to the selector 63.

In the selector 63, one of two inputs is selected in accordance with the state of the control signal (MINUS) which is supplied from a terminal 61b. The selected signal is obtained from a terminal 61c. In other words, when a polarity signal which is supplied from each of the BEMs 8 to 11 is minus, in the inverter 63, the inverted signal which is formed by the inverter 62 is selected. On the other hand, when the polarity signal is plus, in the selector 63, a signal which does not pass through the inverter 62 is selected. Thus, the outputs of the inverter circuits 39a to 39j are obtained from the terminals 41a to 41j, respectively.

Figure 8A:
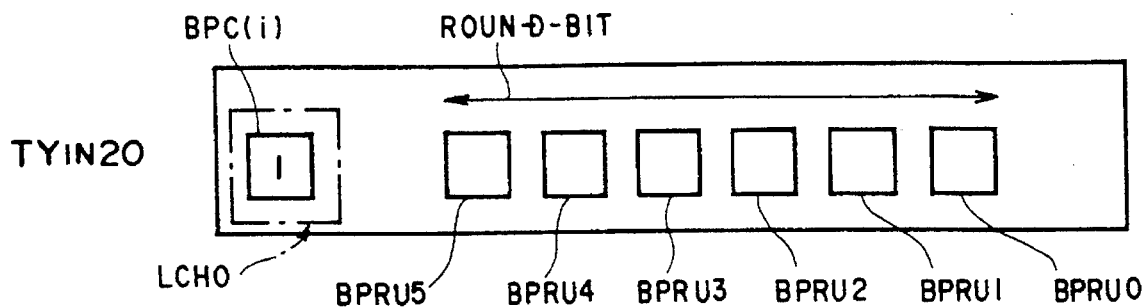
FIGS. 8A to 8C are schematic diagrams which describe an initial value setting circuit of the multiplying circuit.
Figure 8B:
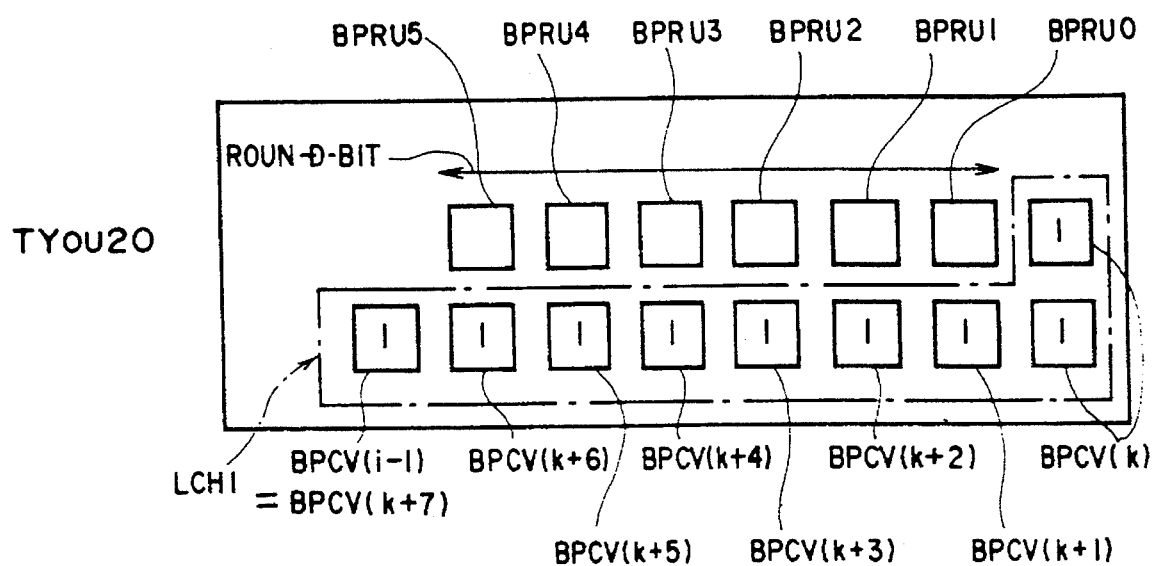
Figure 8C:
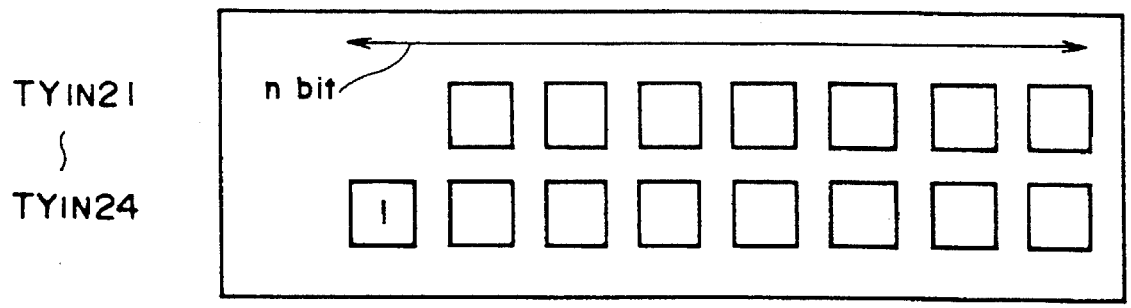

FIGS. 8A to 8C describe the initial value setting circuit 20.

FIG. 8A shows a data input format TYIN20 of the initial value setting circuit 20. In the data input format TYIN20 of the initial value setting circuit 20, round bits BPRU0 to BPRU5 and a complement processing bit BPC(i) are set in digits shown in the figures (i.e., bit positions).

In FIG. 8B, a data output format TYOU20 of the initial value setting circuit 20 is shown. The data output format TYOU20 is converted from the data input format TYIN20 so that the data input format TYIN20 can accord with the data input format of the BRAs 21 to 24. FIG. 8C shows respective data input formats TYIN21 to TYIN24 of the BRAs 21 to 24.

The data output format TYOU20 of the output of the initial value setting circuit 20 consists of the round bits BPRU0 to BPRU5 and conversion bits BPCV(k), BPCV(k+1), BPCV(k+2), ... , and BPCV(i−1) which are equivalent to the complement processing bit BPC(i). The data output format TYOU20 is equal to each of the respective data input formats TYIN21 to TY24 of the BRAs 21 to 24 shown in FIG. 8C. In the example of FIG. 8B, the conversion bit BPCV(i−1) is equal to the conversion bit BPCV(k+7).

In FIGS. 8A and 8B, the suffixes (k) to (i) of the conversion bit BPCV represent digit numbers thereof (namely, $2^k$ to $2^i$). Thus, the complement processing bit BPC which is represented with the alternate long and short dash line LCH 0 has a value of ($2^i$). Thus, the conversion bits BPCV(k) to BPCV(i−1) which is represented with the alternate long and short dash line LCH 1 have a value of $(2 \cdot 2^k + 2^{(k+1)} + 2^{(K+2)} + 2^{(k+3)} + \ldots + 2^{(i-1)})$.

Thus, according to FIGS. 8A and 8B and the abovementioned description, the value of $(2^i)$ of the complement processing bit BPC and the value of $(2 \cdot 2^k + 2^{(k+1)} + 2^{(K+2)} + 2^{(k+3)} + \ldots + 2^{(i-1)})$ are equivalent as shown in the following equation.

$$2^i = \sum_{n=k}^{i-1} 2^n + 2^k$$

As described-above, the complement processing bit BPC(i) [=(2i)] is substituted into the conversion bits BPCV(k) to BPCV(i−1) which are equivalent thereto. In addition, the conversion bits BPCV(k) to BPCV(i−1) and the round bits BPRU0 to BPRU5 are set to the data output format TYOU20 of the initial value setting circuit 20 so that the data output format TYOU20 can accord with the respective data input formats TYIN21 to TYIN24 of the BRA21 to BRA24.

Thus, the construction for adding the complement processing bit BPC(i) to the BRA 21 can be omitted. Therefore, since all the BRAs 21 to 24 can have the same construction, they can be used as basic circuits.

FIGS. 9A to 9F describe the above-mentioned BRAs 21 to 24 and shows their construction. In these figures, only the BRA 21 is described as an example. However, this description also applies to the other BRAs 22 to 24.

FIG. 9A shows the data input format TYIN21 of the BRA 21. This data input format TYIN21 accords with the data output format TYOU20 of the initial value setting circuit 20 which is followed by the BRA 21. This data input format TYIN21 consists of the round bits BPRU0 to BPRU5 and the conversion bits BPCV(k), BPCV(k+1), BPCV(k+2), ..., and BPCV(i−1).

FIG. 9B shows an example of a partial product PP15 which is supplied from the PPG 15 to BRA 21. In this partial product PP15, a multiplicand of eight bits is represented with bits BP0 to BP7. In addition, the position of "1" which is added when converted into the notation using the complement of 2 is represented with a bit BPCC. In the partial product PP15, the bits BP9 and BP8 on the MSB side are represented with [(1) (S*)] because of the calculating process of the complement of 2. The "*" in this expression represents the state where the polarity has been inverted.

FIG. 9C shows the construction of the BRA 21.

In the construction of FIG. 9C, the BRA 21 consists of adders 45a to 45g and an inverter 46.

The adders 45a to 45g are full adders. In each of these adders 45a to 45g, the data input format TYIN21 and the partial product PP15 are added bit by bit so as to obtain an addition output Sum and a carry output Co. With the addition output Sum and the carry output Co, the data output format TYOU21 shown in FIG. 9D is formed.

In the adder 45g, the conversion bit BPCV(k) of the data input format TYIN20 and the bit BP0 of the partial product PP15 are added so as to obtain an addition output Sumg and an output Cog. The addition output Sumg is the conversion bit BPCV(k) of the data output format TYOU21. The carry output Cog is the conversion bit BPCV(k+1) of the data output format TYOU21. The complement processing bit BPCC of the partial product PP15 is the conversion bit BPCV(k) of the data output format TYOU21.

In the adder 45f, the round bit BPRU0 of the data input format TYIN20, the conversion bit BPCV(k+1), and the bit BP1 are added so as to obtain an addition output Sumf and a carry output Cof. The addition output Sumf is the round bit BPRU0 of the data output format TYOU21. The carry output Cof is the conversion bit BPCV(k+2) of the data output format TYOU21.

In the adder 45e, the round bit BPRU1, the conversion bit BPCV(k+2), and the bit BP2 are added so as to obtain an addition output Sume and a carry output Coe. The addition output Sume is the round bit BPRU1 of the data output format TYOU21. The carry output Coe is the conversion bit BPCV(k+3) of the data output format TYOU21.

In the adder 45d, the round bit BPRU2, the conversion bit BPCV(k+3), and the bit BP3 are added so as to obtain an addition output Sumd and a carry output Cod. The addition output Sumd is the round bit BPRU2 of the data output format TYOU21. The carry output Cod is the conversion bit BPCV(k+4) of the data output format TYOU21.

In the adder 45c, the round bit BPRU3, the conversion bit BPCV(k+4), and the bit BP4 are added so as to obtain an addition output Sumc and a carry output Coc. The addition output Sumc is the round bit BPRU3 of the data output format TYOU21. The carry output Coc is the conversion bit BPCV(k+5) of the data output format TYOU21.

In the adder 45b, the round bit BPRU4, the conversion bit BPCV(k+5), and the bit BP5 are added so as to obtain an addition output Sumb and a carry output Cob. The addition output Sumb is the round bit BPRU4 of the data output format TYOU21. The carry output Cob is the conversion bit BPCV(k+6) of the data output format TYOU21.

In the adder 45a, the round bit BPRU5, the conversion bit BPCV(k+6), and the bit BP6 are added so as to obtain an addition output Suma and a carry output Coa. The addition output Suma is the round bit BPRU5 of the data output format TYOU21. The carry output Coa is the conversion bit BPCV(k+7) of the data output format TYOU21.

As shown in FIGS. 9A to 9F, the bit BP7 of the partial product PP15 is the conversion bit BPCV(k+8) of the data output format TYOU21. The inverted output obtained through the inverter 46 is the bit BP7 of the data output format TYOU21. The bit BP8 which represents the polarity of the partial product PP15 is the bit BP8 which represents the polarity in the data output format TYOU21. In addition, the bit BP9 which is "1" is the bit BP9 which is "1" in the data output format TYOU21.

As shown in FIGS. 9D, 9E, and 9F, the data output format TYOU21 is separated into a data output format TYOU21a and a data output format TYOU21b, the data output format TYOU21a being supplied to the CRA 4, the data output format TYOU21b being supplied to the BRA 22 which follows the BRA 21.

The data output format TYOU21a consists of conversion bits BPCV(k) and BPCV(k+1) and a round bit BPRU0 as shown in FIG. 9E. On the other hand, the data output format TYOU21b consists of conversion bits BPCV(k+2) to BPCV(k+8), round bits BPRU1 to BPRU5, and bits BP7 to BP9 as shown in FIG. 9D.

In the BRA 21, the data output format shown in FIG.. 9D is converted into that shown in FIG. 9F so that the data output format TYOU21 can accord with a data input format TYIN22 of the BRA 22 which follows the BRA 21. In other words, as shown in FIG. 9F, the conversion bits BPCV(k+2) to BPCV(k+8) shown in FIG. 9D are converted into the conversion bits BPCV(k) to BPCV(k+6). In addition, the round bit BPRU1 shown in FIG. 9D is converted into a conversion bit BPCV(k).

Moreover, the round bits BPRU2 to BPRU5 and the bit BP7 shown in FIG. 9D are converted into the round bits BPRU0 to BPRU4. The bit BP8 which represents the polarity is converted into the position of the bit BP6. The bit BP9 which is "1" is converted into the position of the bit BP7 of the data output format TYOU21*b* so as to perform the complement calculating process.

As described above, in the first embodiment, the complement processing bit BPC(i) [=($2^i$)] which is defined with the data input format TYIN20 of the initial value setting circuit 20 and which is used for the calculating process of the complement of 2 (sign correcting process) is converted into the conversion bits BPCV(k) to BPCV(i−1) which are equivalent thereto. On the other hand, the data output format TYOU20 of the initial value setting circuit 20 consists of the conversion bits BPCV(k) to BPCV(i−1) and the round bits BPRU0 to BPRU5, the data output format TYOU20 being in accordance with the respective input formats TYIN21 to TYIN24 of the BRAs 21 to 24.

Thus, the BRAs 21 to 24 can have the same construction without necessity of providing and setting a construction for adding the complement processing bit BPC(i) therein.

Thus, by repeatedly using the basic circuits of the BRAs 21 to 24 which have the same construction, a combination type multiplying circuit can be formed. Therefore, with this construction, an effective design can be achieved. In addition, since the BRAs 21 to 24 are not redundantly constructed, with this construction, an optimum designing work can be accomplished.

Figure 10:
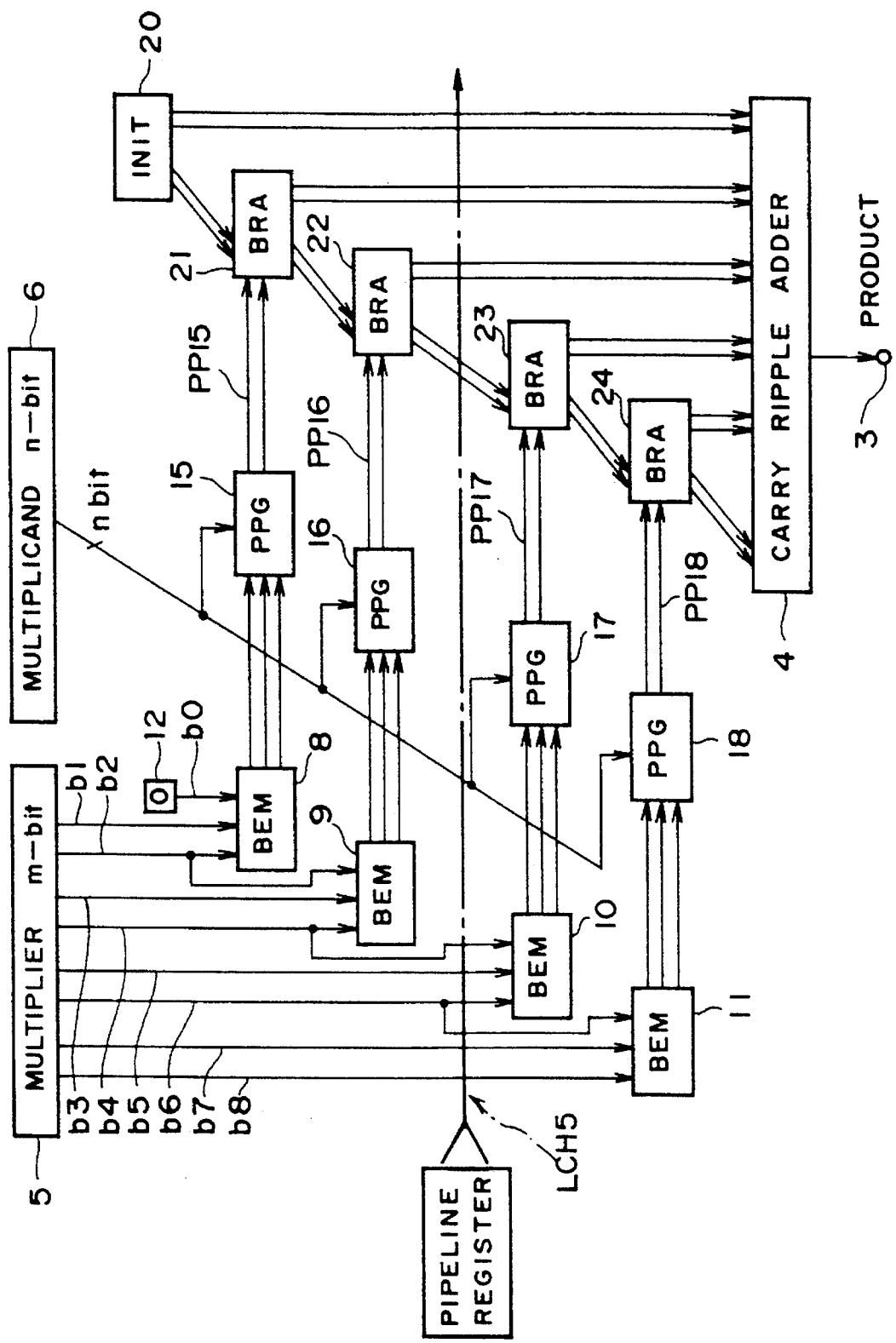
FIG. 10 is a block diagram which shows a modification of the first embodiment according to the present invention.

FIG. 10 shows a modification of the abovementioned first embodiment. In the modification, the present invention is applied to a pipeline type multiplying circuit which performs a multiplication in accordance with the secondary Booth's algorithm.

The modification shown in FIG. 10 differs from the first embodiment in that a pipeline register is disposed at the position of, for example, the alternate long and short dash line Lch 5. With this pipeline register, the calculations performed by the circuit can be speeded up.

The position of the pipeline register is not limited to the position of the alternate long and short dash line Lch 5 shown in FIG. 10. Rather, the pipeline register can be disposed at any position or a plurality of the pipeline registers at a plurality of positions. Since the construction, operation, effects, and so forth of the modification are the same as those of the first embodiment except that the pipeline register is used in the modification, the same portions are represented with the same reference numerals. The portions which have been mentioned will not be repeatedly described for simplicity.

FIGS. 11 and 12A through 12H show the second embodiment of the present invention. In the second embodiment, the present invention is applied to a time-division type multiplying circuit which performs a multiplication in accordance with the secondary Booth's algorithm. In the second embodiment, the same portions as the first embodiment are represented with the same reference numerals thereof. The portions which have been mentioned will not be repeatedly described for simplicity.

Figure 11:
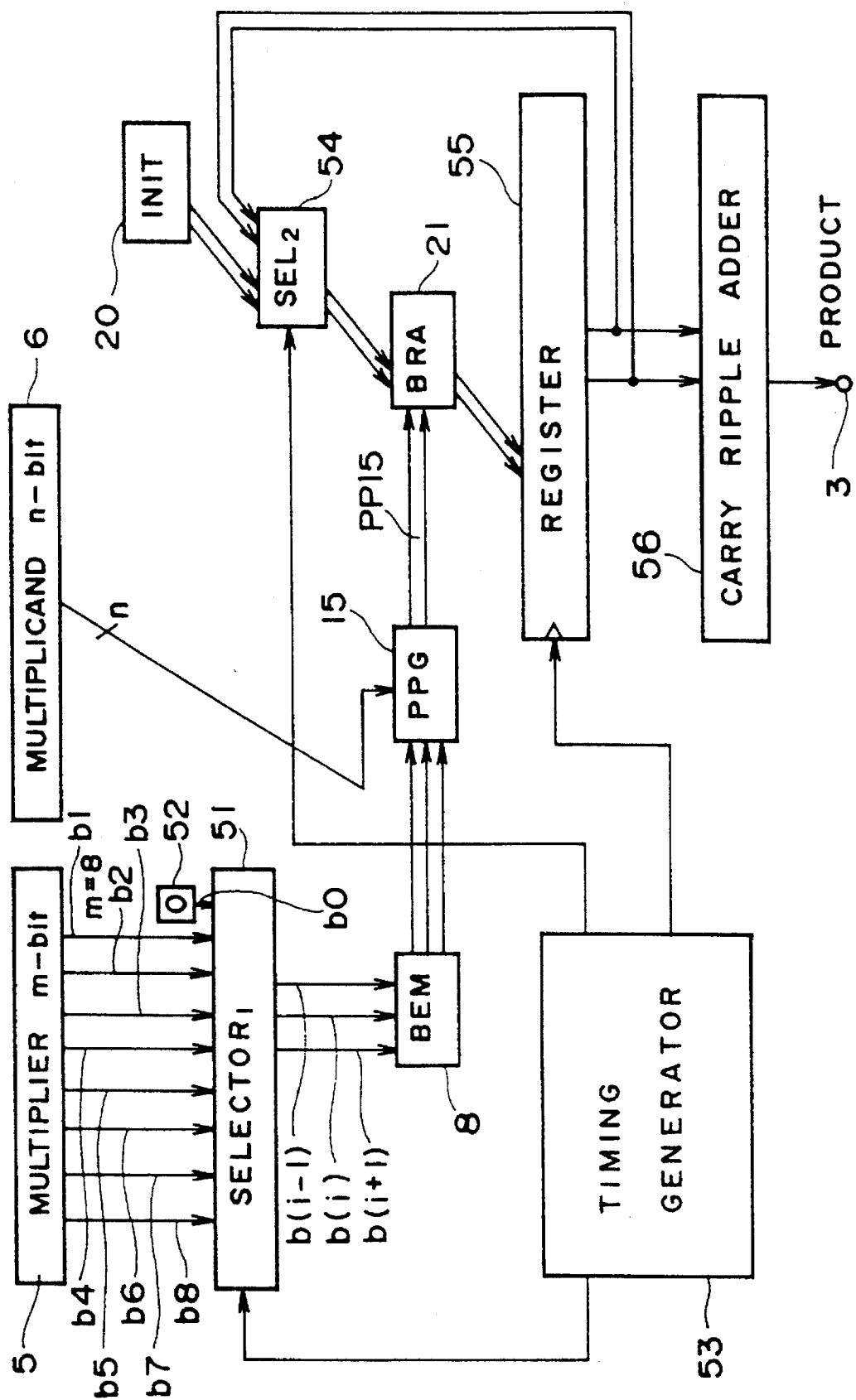
FIG. 11 is a block diagram which describes the construction of a second embodiment of a multiplying circuit according to the present invention.
Figure 12:
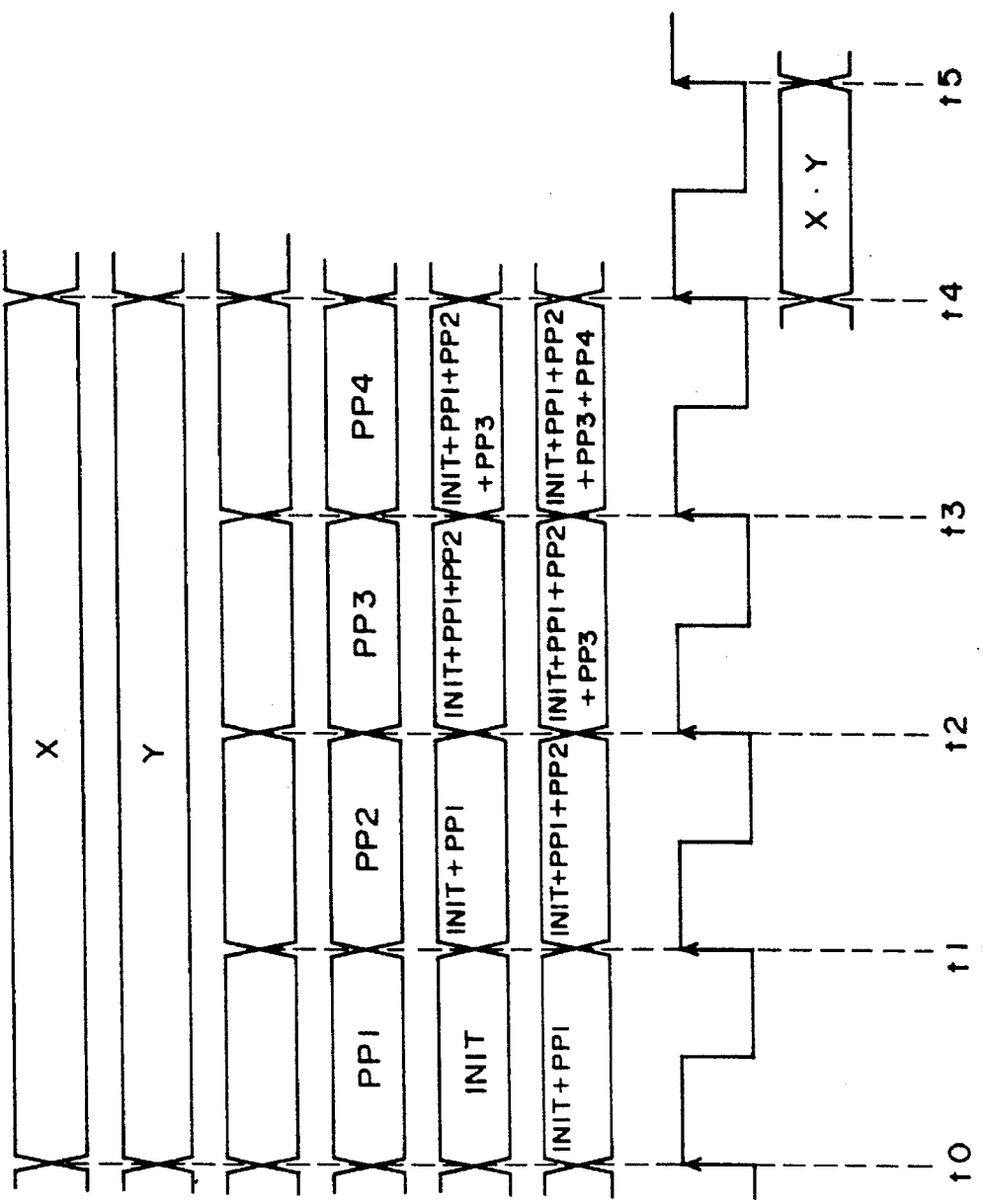
FIGS. 12A through 12H are timing charts which describes the operation of the second embodiment.

The second embodiment shown in FIG. 11 differs from the first embodiment in that only the BRA 21 of the BRAs 21 to 24 is used on a basis of time division. In the second embodiment, the same multiplication as the first embodiment is performed. In addition, since only the BRA 21 is used, only BEM 8 and PPG 15 which accord with the BRA 21 are used.

In the construction shown in FIG. 11, a multiplier of eight bits b1 to b8 which is stored in a register 5 is supplied to a selector 51. In a register 52, data [="0"] is stored. This data is supplied to the selector 51. In addition, a multiplicand of n bits which is stored in a register 6 is supplied to a PPG 15.

In the selector 51, data of successive three bits b(i−1), b(i), and b(i+1) necessary for generating a partial product PP is sequentially selected from the multiplier of eight bits in the direction of the MSB in accordance with a timing signal which is supplied from a timing generator 53. Then the selected data of three bits is output from the selector 51. The resultant data of three bits is supplied to a BEM 8.

In the BEM 8, a signal which defines the magnification and sign of a partial product PP15 is formed in accordance with the data of three bits which is supplied. This signal is supplied to the PPG 15.

In the PPG 15, the partial product PP15 where the complement calculating process (sign correcting process) has been performed is formed in accordance with the signal which defines the magnification and sign of the partial product PP15. The partial product PP15 consists of a multiplicand of n bits, two bits [(1) (Si*)], and a bit BPCC. In the two bits [(1) (Si*)], the complement calculating process for the start bit Si has been performed. In other words, the partial product PP15 is represented with (n+3) bits. This partial product is supplied to the BRA 21.

On the other hand, data including an initial value which is received from an initial value setting circuit 20 is supplied to a selector 54. In the selector 54, either the data including the initial value which is supplied from the initial value setting circuit 20 or data which is fed back from a register 55 is selected in accordance with a timing signal which is supplied from a timing generator 53. When a first addition is performed, in the selector 54, the data including the initial value which is supplied from the initial value setting circuit 20 is selected. When a second or later addition is performed, in the selector 54, the data which is fed back from the register 55 is selected. The data which is selected by the selector 55 is supplied to a BRA 21.

In the BRA 21, the partial product PP15 which is supplied from the PPG 15 and the data which is supplied from the selector 54 are added. Thus, an addition output is formed. This addition output is supplied to the register 55.

In the register 55, the data which is supplied from the BRA 21 is stored in accordance with a clock CLK of the timing generator 53. The data which is stored in the register 55 is supplied to a CRA 56 and the selector 54.

In the CRA 56, data of the data output format TYOU21*a* shown in FIG. 9E is obtained from the data which is supplied from the register 55. The resultant data is added in each timing of the clock CLK. Moreover, in the CRA 56, a carry addition is performed. The resultant addition output is obtained from a terminal 3.

FIGS. 12A through 12H show a timing chart of a circuit operation of the second embodiment. The circuit operation of a loop which consists of the selector 54, the BRA 21, and the register 55 during time periods t0 to t1, t1 to t2, t2 to t3, and t3 to t4 will now be described with reference to FIGS. 12A through 12H.

In the PPG 15, as shown in FIG. 12D, during the time period t0 to t1, the partial product PP1 is formed in accordance with a signal which is received from the BEM 8. The partial product PP1 is supplied to the BRA 21. In the selector 54, during the time period t0 to t1, as shown in FIG. 12E, an initial value INIT is selected. The initial value INIT is supplied to the BRA 21.

In the BRA 21, during the time period t0 to t1, the partial product PP1 and the initial value INIT are added. Thus, an addition output [=INIT+PP1] shown in FIG. 12F is formed. The addition output [=INIT+PP1] is supplied to the register 55.

In the register 55, the addition output [=INIT+PP1] is stored in accordance with a timing of the clock CLK. The addition output [=INIT+PP1] is fed back to the selector 54. In addition, the addition output is also supplied to the CRA 56.

In the CRA 56, only the data of the data output format TYOU21a shown in FIG. 9E of the addition output [=INIT+PP1] is stored.

In the PPG 15, during the time period t1 to t2, a partial product PP2 is formed in accordance with a signal which is received from the BEM 8. The partial product PP2 is supplied to the BRA 21. In the selector 54, during the time period t1 to t2, the addition output [=INIT+PP1] which is fed back from the register 55 is selected and then supplied to the BRA 21.

In the BRA 21, during the time period t1 to t2, the partial product PP2 and the addition output [=INIT+PP1] are added. Thus, an addition output [=INIT+PP1+PP2] is formed. The addition output is supplied to the register 55.

In the register 55, the addition output [=INIT+PP1+PP2] is stored in accordance with a timing of the clock CLK. This addition output is fed back to the selector 54. In addition, the addition output is supplied to the CRA 56. In the CRA 56, only the data of the data output format TYOU21a shown in FIG. 9E of the addition output is stored.

In the PPG 15, during the time period t2 to t3, a partial product PP3 is formed in accordance with a signal which is received from the BEM 8. The partial product PP3 is supplied to the BRA 21. In the selector 54, during the time period t2 to t3, the addition output [=INIT+PP1+PP2] which is fed back from the register 55 is selected and then supplied to the BRA 21.

In the BRA 21, during the time period t2 to t3, the partial product PP3 and the addition output [=INIT+PP1+PP2] are added. Thus, an addition output [=INIT+PP1+PP2+PP3] is formed. This addition output is supplied to the register 55.

In the register 55, the addition output [=INIT+PP1+PP2+PP3] is stored in accordance with a timing of the clock CLK. This addition output is fed back to the selector 54 and then supplied to the CRA 56. In the CRA 56, only the data of the data output format TYOU21a shown in FIG. 9E of the addition output is stored.

In the PPG 15, during the time period t3 to t4, a partial product PP4 is formed in accordance with a signal which is received from the BEM 8. The partial product PP4 is supplied to the BRA 21. In the selector 54, during the time period t3 to t4, the addition output [=INIT+PP1+PP2+PP3] which is fed back from the register 55 is selected and then supplied to the BRA 21.

In the BRA 21, during the time period t3 to t4, the partial product PP4 and the addition output [=INIT+PP1+PP2+PP3] are added. Thus, an addition output [=INIT+PP1+PP2+PP3+PP4] is formed. This addition output is supplied to the register 55.

In the register 55, the addition output [=INIT+PP1+PP2+PP3+PP4] is stored in accordance with a timing of the clock CLK. This addition output is fed back to the selector 54. In addition, this addition output is also supplied to the CRA 56. In the CRA 56, only the data of the data output format TYOU21a shown in FIG. 9E of the addition output is stored.

After the time period t4 shown in FIG. 12G, in the CRA 56, a carry addition is performed. Thus, a multiplication result [=X·Y] shown in FIG. 12H is formed. The multiplication result [=X·Y] is obtained from the terminal 3.

As mentioned above, in the second embodiment, since the feedback loop disposed from the register 55 to the selector 54 is provided along with the loop disposed from the selector 54 to the BRA 21 to the register 55 to the CRA 56, the BRA 21 can be used on a basis of time division basis. Thus, with this construction, an effective circuit designing can be effectively performed.

The second embodiment is the same as the first embodiment except that the time-division type multiplying circuit is used. Since the construction, operation, effects, and so forth of the second embodiment are the same as those of the first embodiment except that the second embodiment uses the time-division type multiplying circuit, the same portions are represented with the same reference numerals. The portions which have been mentioned will not be repeatedly described for simplicity.

FIGS. 13 and 14A through 14G show the third embodiment of the present invention. In the third embodiment, the present invention is applied to a time-division type multiplying circuit which performs a multiplication in accordance with the secondary Booth's algorithm. In the third embodiment, the same portions as the first and second embodiments are represented with the same reference numerals thereof for simplicity. The portions which have been mentioned will not be repeatedly described.

Figure 13:
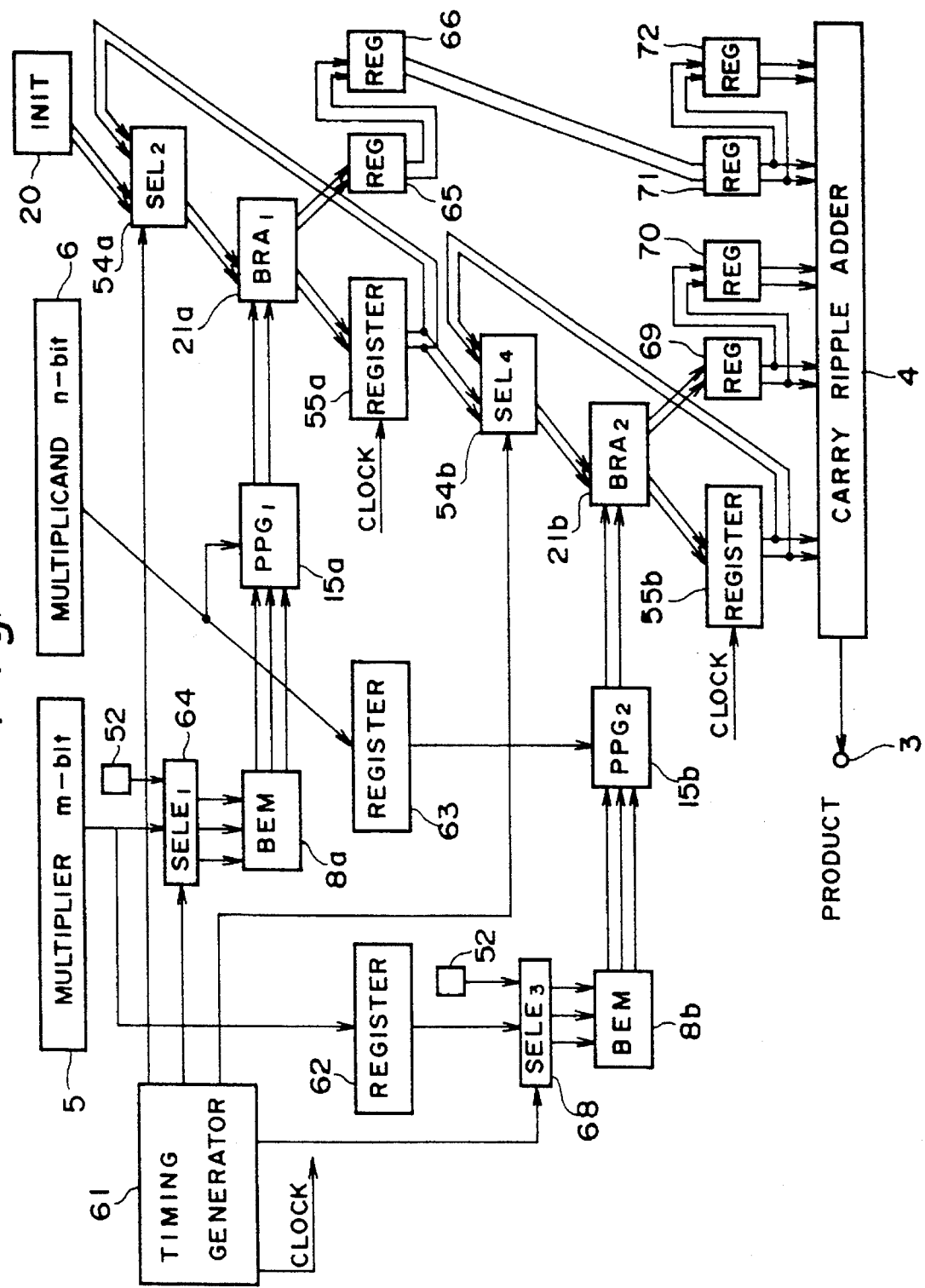
FIG. 13 is a block diagram which shows a third embodiment of a multiplying circuit according to the present invention.

The third embodiment shown in FIG. 13 is the same as the second embodiment in that a time-division type multiplying circuit is used. On the other hand, they differ each other in that the third embodiment has two levels of feedback loops.

In the construction shown in FIG. 13, a multiplier of eight bits, b1 to b8, which is stored in a register 5 is supplied to a register 62 and a selector 64. In addition, in a register 52, data [="0"] is stored. This data is supplied to the selector 64. A multiplicand of n bits which is stored in a register 6 is supplied to a register 63 and a PPG 15.

In the selector 64, data of successive three bits b(i−1), b(i), and b(i+1) necessary for generating a partial product PP is selected from the multiplier of eight bits in the direction of the MSB in accordance with a clock CLK which is supplied from a timing generator 61. The resultant data of three bits is supplied to a BEM 8a.

In the BEM 8a, a signal which defines the magnification and sign of a partial product is formed in accordance with the data of three bits which is supplied. This signal is supplied to the PPG 15a.

In the PPG 15a, a partial product where the complement calculating process (sign correcting process) has been performed is formed in accordance with the signal which defines the magnification and sign of the partial product. The partial product consists of a multiplicand of n bits, two bits [(1) (Si*)], and a bit BPCC. In the two bits [(1) (Si*)], the complement calculating process for the start bit Si has been performed. In other words, the partial product is represented with (n+3) bits. This partial product is supplied to the BRA 21a.

On the other hand, data including an initial value which is received from an initial value setting circuit 20 is supplied to a selector 54a. In the selector 54a, either the data including the initial value which is supplied from the initial value setting circuit 20 or data which is fed back from a register 55a is selected in accordance with the clock CLK which is supplied from the timing generator 61. The data selection in the selector 54a is the same as that of the selector 54 of the second embodiment. This portion which has been mentioned will not be repeatedly described for simplicity. The data which is selected by the selector 54a is supplied to a BRA 21a.

In the BRA 21a, the partial product which is supplied from the PPG 15a and the data which is supplied from the selector 54a are added. Thus, an addition output is formed. This addition output is supplied to the register 55a. In addition, only the data of the data output format TYOU21a shown in FIGS. 9A to 9F of the addition output is stored in the register 65.

The data which is stored in the register 65 is supplied and stored in registers 66, 71, and 72 one after the other in accordance with timings of the clock CLK. The data which are stored in the registers 71 and 72 are stored in a CRA 4 in accordance with a timing of the clock CLK.

In the register 55a, the data which is supplied from the BRA 21a is stored in accordance with the clock CLK which is supplied from the timing generator 53. In addition, the data is supplied to a selector 54b and the selector 54a, the selector 54b following the selector 54a.

On the other hand, the multiplier of eight bits, b1 to b8, which is stored in the register 62 is supplied to a selector 68. Moreover, in the register 52, data [="0"] is stored. This data is supplied to the selector 68. The multiplicand of n bits which is stored in the register 63 is supplied to a PPG 15b.

In the selector 68, data of successive three bits b(i−1), b(i), and b(i+1) necessary for generating a partial product PP is selected from the multiplier of eight bits in the direction of the MSB in accordance with the clock CLK which is supplied from the timing generator 61. The resultant data of three bits is supplied to a BEM 8b.

In the BEM 8b, a signal which defines the magnification and sign of a partial product is formed in accordance with the data of three bits in the same manner as the BEM 8a. This signal is supplied to the PPG 15b.

In the PPG 15b, a partial product is formed in accordance with the above-mentioned signal which defines the magnification and sign of the partial product in the same manner as the PPG 15a. The partial product is supplied to a BRA 21b.

On the other hand, the value which is output from the register 55a is supplied to a selector 54b. In the selector 54b, either the data which is supplied from the register 55a or the data which is fed back from the register 55b is selected in accordance with the clock CLK which is supplied from the timing generator 61. The data selection of the selector 54b is the same as that of the register 54 of the second embodiment. This portion which has been mentioned will not be repeatedly described for simplicity. The data selected by the selector 54b is supplied to a BRA 21b.

In the BRA 21b, the partial product which is supplied from the PPG 15b and the data which is supplied from the selector 54b are added. Thus, an addition output is formed. This addition output is supplied to the register 55b. Only the data of the data output format TYOU21a shown in FIGS. 9A to 9F of the addition output is stored in a register 69.

The data which is stored in the register 69 is supplied and stored in the CRA 4 and a register 70 which follows the register 69 in accordance with timings of the clock CLK. The data which is stored in the register 70 is supplied and stored in the CRA 4 in accordance with a timing of the clock CLK.

In the register 55b, the data which is supplied from the BRA 21b is stored in accordance with the clock CLK which is supplied from the timing generator 61. In addition, the data is supplied to the selector 54b and the CRA 4.

In the CRA 4, the data which are supplied from the registers 55b, 69, 70, 71, and 72 are added. Thereafter, in the CRA 4, a carry addition is performed. The resultant addition output is obtained from a terminal 3.

FIGS. 14A through 14G show a timing chart of the circuit operation of the third embodiment. Since the functions and constructions of the selectors 64 and 68, the BEMs 8a and 8b, the PPGs 15a and 15b, the BRAs 21a and 21b, the selectors 54a and 54b, the registers 55a and 55b, and so forth of the third embodiment are the same as those of the selector 51, the BEM 8, the PPG 15, the BRA 21, the selector 54, and the register 55 of the second embodiment, the portions which have been mentioned will not be repeatedly described for simplicity.

As shown in FIG. 14A, during the time period t00 to t20, a multiplier X which is received from a register 5 is supplied to a selector 64 and a register 62. In addition, as shown in FIG. 14B, during the time period t00 to t20, a multiplicand Y which is received from a register 6 is supplied to a PPG 15a and a register 63.

In the PPG 15a, as shown in FIG. 14C, during the time period t00 to t10, a partial product PP1 is formed and then supplied to a BRA 21a. Moreover, in the selector 54a, as shown in FIG. 14D, during the time period t00 to t10, an initial value INIT is selected. This initial value INIT is supplied to a BRA 21.

In the BRA 21, during the time period t00 to t10, the partial product PP1 and the initial value INIT are added. Thus, an addition output [=INIT+PP1] is formed. The addition output [=INIT+PP1] is stored in a register 55a. Moreover, the addition output is fed back to the selector 54a. Only data of a data output format TYOU21a shown in FIGS. 9A to 9F of the addition output is stored in a register 65.

In the PPG 15a, during the time period t10 to t20, as shown in FIG. 14C, a partial product PP2 is formed and then supplied to the BRA 21a. Moreover, in the selector 54a, during the time period t10 to t20, the addition output [=INIT+PP1] which is fed back from the register 55a is selected and then supplied to the BRA 21a.

In the BRA 21a, during the time period t10 to t20, partial product PP2 and the addition output [=INIT+PP1] are added. Thus, an addition output [=INIT+PP1+PP2] is formed. The addition output [=INIT+PP1+PP2] is stored in the register 55a. In addition, the addition output is fed back to the selector 54a.

During the time period t00 to t11, the content which is stored in the register 65 is stored in the register 66. Only the data of the data output format TYOU21a shown in FIGS. 9A to 9F of the addition output [=INIT+PP1+PP2] during the time period t10 to t20 is stored in the register 65.

In the selector 54b, during the time period t20 to t30, as shown in FIG. 14F, the addition output [=INIT+PP1+PP2] which is supplied from the register 54b is selected. The addition output is Supplied to the BRA 21b. In the PPG 15b, during the time period t20 to t30, as shown in FIG. 14E, a partial product PP3 is formed and then supplied to the BRA 21b.

In the BRA 21b, during the time period t20 to t30, the partial product PP3 and the addition output [=INIT+PP1+PP2] are added. Thus, an addition output [=INIT+PP1+PP2+PP3] is formed. The addition output [=INIT+PP1+PP2+PP3] is stored in the register 55b. In addition, the addition output is fed back to the selector 54b. Only the data of the data output format TYOU21a shown in FIGS. 9A to 9F of the addition output is supplied and stored in a register 69.

When the addition output [=INIT+PP1+PP2+PP3] which is received from the BRA 21b is supplied and stored in the registers 55b and 69, the content which is stored in the register 66 is supplied and stored in a register 71. In addition, the content which is stored in the register 65 is supplied and stored in the register 66.

In the selector 54b, during the time period t30 to t40, the addition output which is received from the register 54b is selected.

In the PPG 15b, during the time period t30 to t40, as shown in FIG. 14E, a partial product PP4 is formed and then supplied to the BRA 21. Moreover, in the selector 54b, during the time period t30 to t40, the addition output [=INIT+PP1+PP2+PP3] which is received from the register 54b is selected and then supplied to the BRA 21b.

In the BRA 21b, during the time period t30 to t40, the partial product PP4 and the addition output [=INIT+PP1+PP2+PP3] are added. The resultant addition output [=INIT+PP1+PP2+PP3+PP4] is formed. The resultant addition output is supplied to the register 55b.

During the time period t20 to t30, the content which is stored in the register 69 is stored in the register 70. Only the data of the data output format TYOU21a shown in FIGS. 9A to 9F of the addition output [=INIT+PP1+PP2+PP3+PP4] during the time period t30 to t40 is supplied and stored in the register 69.

When the addition output [=INIT+PP1+PP2+PP3+PP4] which is received from the BRA 21b is supplied and stored in the registers 55b and 69, the content which is stored in the register 71 is stored in the register 72. In addition, the content which is stored in the register 66 is stored in the register 71.

In the CRA 4, during the time period t30 to t40, the addition output [=INIT+PP1+PP2+PP3+PP4] which is supplied from the register 55b is obtained. Moreover, in the CRA 4, the contents which are stored in the registers 69, 70, 71, and 72 are obtained. After the time period t40 shown in FIG. 14G, in the CRA 4, a carry addition is performed. Thus, a multiplication result [=X·Y] of the multiplier X and the multiplicand Y is formed. The multiplication result [=X·Y] is obtained from the terminal 3.

Since the construction of the third embodiment is the same as that of the second embodiment, the same portions are represented with the same reference numerals. The portions which have been mentioned will be not be repeatedly described for simplicity.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

According to the combination type multiplying circuit of the present invention, the same basic circuits in the same construction can be repeatedly used. As a result, with this construction, an optimum circuit design work can be effectively achieved.

In addition, according to the time-division type multiplying circuit of the present invention, the basic circuits in the same construction can be repeatedly used on a time base. As a result, with this construction, an efficient circuit design can be achieved.

What is claimed is:

1. A multiplying circuit for multiplying a multilicand and a multiplier in accordance with a Booth's algorithm, using a plurality of blocks of sign and magnification bits which are generated by using a plurality of respective blocks of predetermined bits of said multiplier, comprising:

partial product generating means for generating a plurality of respective partial products by using said plurality of respective blocks of sign and magnification bits and by using said multiplicand, performing a sign correcting process and a rounding-up process of each of said plurality of partial products, and supplying sign-corrected partial products;

initial value setting means for receiving an initial value as an input of bits for a rounding-up process and for supplying initial data having a first part and a second part and including said initial value for a rounding-up process and sign correcting data for said sign correcting process, said first part of said initial data having a first predetermined format in a redundancy binary notation in which two signals corresponding to each bit position are supplied, and said second part of said initial data having a second predetermined format in said redundancy binary notation;

first adding means including a plurality of identical serially-connected adders having the same construction, each one of said plurality of serially-connected adders having first inputs for receiving data with said first predetermined format in said redundancy binary notation which are supplied solely by a preceding one of said plurality of serially-connected adders, and second input for receiving a corresponding one of said plurality of sign-corrected partial products, said each one of said plurality of serially-connected adders adding said corresponding data with said first predetermined format in said redundancy binary notation which are received through said first inputs and said corresponding one of said plurality of sign-corrected partial products received through said second input, supplying a second part of a result of the addition in said second predetermined format in said redundancy binary notation, and supplying a first part of the result of the addition in said first predetermined format in said redundancy binary notation to a subsequent one of said plurality of serially-connected adders, except a first one of said plurality of serially-connected adders being a sole one of said plurality of serially-connected adders which is connected to said initial value setting means adding said first part of said initial data supplied by said initial value setting means solely to said first one of said plurality of serially-connected adders in said first predetermined format in said redundancy binary notation which are received through said first inputs of said first one of said plurality of serially-connected adders to a corresponding one of said plurality of sign-corrected partial products which is received through said second input of said first one of said plurality of serially-connected adders; and second adding means for adding said first part of the result of the addition of a last one of said plurality of serially-connected adders, said second part of the result of the addition of each of said plurality of serially-connected adders, and said second part of initial data supplied by said initial data setting means.

2. The multiplying circuit as set forth in claim 1, wherein each of said plurality of serially-connected adders is a Booth's redundancy adder.

3. A multiplying circuit for performing a multiplication of data of m bits and data of n bits in accordance with a Booth's algorithm, comprising:

means for dividing an input data of m bits into a plurality of blocks of predetermined bits and for performing preprocessing by a plurality of Booth's encoder modules so that at least one bit of respective ones of said plurality of blocks of predetermined bits overlaps;

a plurality of partial product generating means for generating a plurality of respective partial products by using respective outputs of said plurality of Booth's encoder modules and said data of n bits, performing a sign correcting process and a rounding-up process of each of said plurality of partial products, and supplying sign-corrected partial products;

an initial value setting circuit for receiving an initial value as an input of bits for a rounding-up process and supplying initial data having a first part and a second part and including said initial value for a rounding-up process and sign correcting data, said first part having a first predetermined format in a redundancy binary notation in which two signals corresponding to each bit position are supplied, and said second part having a second predetermined format in said redundancy binary notation;

a plurality of identical serially-connected Booth's redundancy adders having the same construction, each one of said plurality of serially-connected Booth's redundancy adders performing an addition of a corresponding sign-corrected partial product supplied by a corresponding one of said plurality of partial product generating means and a first part of data supplied by a preceding one of said plurality of serially-connected Booth's redundancy adders which has said first predetermined format in said redundancy binary notation, supplying a second part of a result of the addition in said second predetermined format in said redundancy binary notation, and supplying a first part of the result of the addition in said first predetermined format in said redundancy binary notation to a subsequent one of said plurality of serially-connected Booth's redundancy adders, except a first one of said plurality of serially-connected Booth's redundancy adders being connected to said initial value setting circuit, adding said first part of initial data supplied by said initial value setting circuit in said first predetermined format in said redundancy binary notation and a corresponding sign-corrected partial product supplied by a corresponding one of said plurality of partial product generating means; and at least one carry ripple adder for performing a carry addition of a first part of the result of the addition of a last one of said plurality of serially-connected Booth's redundancy adders, said second part of said result of the addition performed by each of said plurality of serially-connected Booth's redundancy adders and said second part of initial data supplied by said initial value setting circuit.

4. The multiplying circuit as set forth in claim 3, wherein each one of said plurality of Booth's redundancy adders comprises a plurality of adders and one inverter, each of said plurality of adders outputting a sum bit and a carry bit which are output by said corresponding one of said plurality of Booth's redundancy adders.

5. A multiplying circuit for performing a multiplication of data of m bits and data of n bits in accordance with a Booth's algorithm, comprising:

means for dividing an input data of m bits into a plurality of blocks of predetermined bits so that at least one bit of respective ones of said plurality of blocks of predetermined bits overlaps, including first selecting means for selectively outputting said plurality of blocks of predetermined bits one block every predetermined period of time, and a Booth's encoder module for preprocessing each said one block output by said first selecting means every said predetermined period of time;

a single partial product generating means for generating a sign-corrected partial product by using the corresponding preprocessed block supplied by said Booth's encoder module every said predetermined period of time and by using said data of n bits, and supplying an output therewith;

an initial value setting circuit for receiving an initial value as an input of bits for a rounding-up process and supplying initial data including said initial value and sign correcting data in a first predetermined format in a redundancy binary notation in which two signals corresponding to each bit position are supplied;

second selecting means having a first input and a second input for selectively outputting one of said first input and said second input in said first predetermined format in said redundancy binary notation, said first input being supplied with said initial data from said initial value setting circuit;

a single Booth's redundancy adder for performing an addition of said sign-corrected partial product supplied by said single partial product generating means and an output supplied by said second selecting means in said first predetermined format in said redundancy binary notation, and supplying an output therewith having a first part in said first predetermined format in said redundancy binary notation and a second part in a second predetermined format in said redundancy binary notation;

means for temporarily storing a first and a second part of the output of said single Booth's redundancy adder, and thereafter feeding back said stored first part in said first predetermined format in said redundancy binary notation to said second input of said second selecting means and supplying said stored second part as an output every said predetermined period of time; and at least one carry ripple adder for performing a carry addition of said stored second part.

6. The multiplying circuit as set forth in claim 5, further comprising:

additional means for dividing the input data of m bits into a plurality of blocks of predetermined bits and for performing preprocessing by an additional Booth's encoder module so that at least one bit of respective ones of said plurality of blocks of predetermined bits overlaps;

additional partial product generating means for generating a sign-corrected partial product by using an output of said additional Booth's encoder module and said data of n bits; and an additional Booth's redundancy adder for performing an addition of said sign-corrected partial product supplied by said additional partial product generating means and said first part of the output of said single Booth's redundancy adder, wherein an output of said additional Booth's redundancy adder in said first predetermined format in said redundancy binary notation and said stored second part of the output of said single Booth's redundancy adder are added by said carry ripple adder.

7. The multiplying circuit as set forth in claim 6, further comprising a plurality of registers disposed between said single and additional Booth's redundancy adders and said carry ripple adder so as to accomplish a coincidence of digits therebetween.

* * * * *